US009535838B2

(12) United States Patent
Ajanovic et al.

(10) Patent No.: US 9,535,838 B2
(45) Date of Patent: *Jan. 3, 2017

(54) ATOMIC OPERATIONS IN PCI EXPRESS

(71) Applicant: Intel Corporation, Santa Clara, CA (US)

(72) Inventors: Jasmin Ajanovic, Portland, OR (US); Mahesh Wagh, Portland, OR (US); Prashant Sethi, Folsom, CA (US); Debendra Das Sharma, Saratoga, CA (US); David J. Harriman, Portland, OR (US); Mark B. Rosenbluth, Uxbridge, MA (US); Ajay V. Bhatt, Portland, OR (US); Peter Barry, Ardncrusha (IE); Scott Dion Rodgers, Hillsboro, OR (US); Anil Vasudevan, Portland, OR (US); Sridhar Muthrasanallur, Puyallup, WA (US); James Akiyama, Beaverton, OR (US); Robert G. Blankenship, Tacoma, WA (US); Ohad Falik, Kfar Saba (IL); Avi Mendelson, Haifa (IL); Ilan Pardo, Ramat Hasharon (IL); Eran Tamari, Ramat Gan (IL); Eliezer Weissmann, Haifa (IL); Doron Shamia, Modiin (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/691,106

(22) Filed: Nov. 30, 2012

(65) Prior Publication Data
US 2013/0111086 A1    May 2, 2013

Related U.S. Application Data

(63) Continuation of application No. 12/883,781, filed on Sep. 16, 2010, now Pat. No. 8,549,183, and a continuation of application No. 11/592,341, filed on Nov. 2, 2006, now Pat. No. 7,949,794.

(51) Int. Cl.
G06F 3/00      (2006.01)
G06F 13/14    (2006.01)
(Continued)

(52) U.S. Cl.
CPC ......... *G06F 12/0831* (2013.01); *G06F 1/3203* (2013.01); *G06F 1/324* (2013.01);
(Continued)

(58) Field of Classification Search
None
See application file for complete search history.

(56) References Cited

U.S. PATENT DOCUMENTS 6,175,884 B1    1/2001    Harriman et al.
6,212,645 B1    4/2001    Tjandrasuwita
(Continued)

FOREIGN PATENT DOCUMENTS

TW    200421087 A    10/2004

OTHER PUBLICATIONS

Response to Office Action received for U.S. Appl. No. 13/198,559, filed on Feb. 29, 2012, 7 pages.
(Continued)

*Primary Examiner* — David E Martinez
(74) *Attorney, Agent, or Firm* — Patent Capital Group

(57) ABSTRACT

A method and apparatus for enhancing/extending a serial point-to-point interconnect architecture, such as Peripheral Component Interconnect Express (PCIe) is herein described. Temporal and locality caching hints and prefetching hints
(Continued)

are provided to improve system wide caching and prefetching. Message codes for atomic operations to arbitrate ownership between system devices/resources are included to allow efficient access/ownership of shared data. Loose transaction ordering provided for while maintaining corresponding transaction priority to memory locations to ensure data integrity and efficient memory access. Active power substates and setting thereof is included to allow for more efficient power management. And, caching of device local memory in a host address space, as well as caching of system memory in a device local memory address space is provided for to improve bandwidth and latency for memory accesses.

25 Claims, 21 Drawing Sheets

(51) Int. Cl.
```
G06F 12/08      (2016.01)
G06F 1/32       (2006.01)
H04L 12/66      (2006.01)
G06F 13/40      (2006.01)
G06F 13/38      (2006.01)
G06F 13/42      (2006.01)
```

(52) U.S. Cl.
CPC ........ *G06F 1/3253* (2013.01); *G06F 12/0815* (2013.01); *G06F 13/385* (2013.01); *G06F 13/4045* (2013.01); *G06F 13/4068* (2013.01); *G06F 13/4265* (2013.01); *H04L 12/66* (2013.01); *G06F 2212/621* (2013.01); *Y02B 60/1217* (2013.01); *Y02B 60/1235* (2013.01)

(56) References Cited

U.S. PATENT DOCUMENTS

| | | |
|---|---|---|
| 6,272,563 B1 | 8/2001 | Ajanovic et al. |
| 6,385,657 B1 | 5/2002 | Parady |
| 6,542,968 B1 | 4/2003 | Spencer et al. |
| 6,665,802 B1 | 12/2003 | Ober |
| 6,691,192 B2 | 2/2004 | Ajanovic et al. |
| 6,766,419 B1 | 7/2004 | Zahir et al. |
| 6,848,057 B2 | 1/2005 | Hicok |
| 6,915,415 B2 | 7/2005 | Mayfield et al. |
| 6,944,617 B2 | 9/2005 | Harriman |
| 7,099,318 B2 | 8/2006 | Harriman |
| 7,130,933 B2 | 10/2006 | Bissessur et al. |
| 7,152,128 B2 | 12/2006 | Wehage et al. |
| 7,162,584 B2 | 1/2007 | Adl-Tabatabai et al. |
| 7,177,971 B2 | 2/2007 | Ajanovic et al. |
| 7,184,399 B2 | 2/2007 | Lee et al. |
| 7,210,000 B2 | 4/2007 | Creta et al. |
| 7,228,362 B2 | 6/2007 | Jen et al. |
| 7,231,486 B2 | 6/2007 | Ajanovic et al. |
| 7,293,184 B2 | 11/2007 | Zimmer et al. |
| 7,360,031 B2 | 4/2008 | Lakshmanamurthy et al. |
| 7,366,921 B2 | 4/2008 | Ranganathan |
| 7,441,128 B2 | 10/2008 | Ho et al. |
| 7,467,313 B2 | 12/2008 | Han et al. |
| 7,536,473 B2 | 5/2009 | Ajanovic et al. |
| 7,539,809 B2 | 5/2009 | Juenger |
| 7,581,026 B2 | 8/2009 | Harriman et al. |
| 7,606,933 B2* | 10/2009 | Reinhard et al. ............ 709/238 |
| 7,624,221 B1 | 11/2009 | Case |
| 7,684,970 B2 | 3/2010 | Hooper et al. |
| 7,752,376 B1 | 7/2010 | Johnsen et al. |
| 7,761,666 B2 | 7/2010 | Narad et al. |
| 7,899,943 B2 | 3/2011 | Ajanovic et al. |
| 7,930,566 B2 | 4/2011 | Ajanovic et al. |
| 7,949,794 B2 | 5/2011 | Ajanovic et al. |
| 8,073,981 B2 | 12/2011 | Ajanovic et al. |
| 8,099,523 B2 | 1/2012 | Ajanovic et al. |
| 8,230,119 B2 | 7/2012 | Ajanovic et al. |
| 8,230,120 B2 | 7/2012 | Ajanovic et al. |
| 8,447,888 B2 | 5/2013 | Ajanovic et al. |
| 8,473,642 B2 | 6/2013 | Ajanovic et al. |
| 8,549,183 B2 | 10/2013 | Ajanovic et al. |
| 8,555,101 B2 | 10/2013 | Ajanovic et al. |
| 8,793,404 B2 | 7/2014 | Ajanovic et al. |
| 9,026,682 B2 | 5/2015 | Ajanovic et al. |
| 9,032,103 B2 | 5/2015 | Ajanovic et al. |
| 9,098,415 B2 | 8/2015 | Ajanovic et al. |
| 2002/0091865 A1 | 7/2002 | Parady |
| 2003/0229762 A1 | 12/2003 | Maiyuran et al. |
| 2004/0193734 A1* | 9/2004 | Barron ................. H04L 29/06 709/250 |
| 2004/0268051 A1 | 12/2004 | Berg et al. |
| 2005/0071542 A1 | 3/2005 | Weber et al. |
| 2005/0138260 A1 | 6/2005 | Love |
| 2005/0289306 A1 | 12/2005 | Muthrasanallur et al. |
| 2006/0179195 A1 | 8/2006 | Sharma et al. |
| 2006/0294327 A1 | 12/2006 | Sharma et al. |
| 2007/0079073 A1 | 4/2007 | Rosenbluth et al. |
| 2007/0124728 A1 | 5/2007 | Rosenbluth et al. |
| 2007/0147426 A1 | 6/2007 | Sharma et al. |
| 2007/0245046 A1 | 10/2007 | Asaro et al. |
| 2008/0082496 A1 | 4/2008 | Kalos et al. |
| 2008/0091915 A1 | 4/2008 | Moertl et al. |
| 2008/0109565 A1 | 5/2008 | Ajanovic et al. |
| 2008/0195791 A1 | 8/2008 | Ajanovic et al. |
| 2008/0196034 A1 | 8/2008 | Ajanovic et al. |
| 2008/0215822 A1 | 9/2008 | Ajanovic et al. |
| 2009/0031058 A1 | 1/2009 | Radhakrishnan et al. |
| 2011/0072164 A1 | 3/2011 | Ajanovic et al. |
| 2011/0161703 A1 | 6/2011 | Ajanovic et al. |
| 2011/0173367 A1 | 7/2011 | Ajanovic et al. |
| 2011/0208925 A1 | 8/2011 | Ajanovic et al. |
| 2011/0238882 A1 | 9/2011 | Ajanovic et al. |
| 2012/0036293 A1 | 2/2012 | Ajanovic et al. |
| 2012/0089750 A1 | 4/2012 | Ajanovic et al. |
| 2012/0254563 A1 | 10/2012 | Ajanovic et al. |
| 2013/0091317 A1 | 4/2013 | Ajanovic et al. |
| 2013/0097353 A1 | 4/2013 | Ajanovic et al. |
| 2013/0111086 A1 | 5/2013 | Ajanovic et al. |
| 2013/0132622 A1 | 5/2013 | Ajanovic et al. |
| 2013/0132636 A1 | 5/2013 | Ajanovic et al. |
| 2013/0132683 A1 | 5/2013 | Ajanovic et al. |
| 2015/0161050 A1 | 6/2015 | Ajanovic et al. |

OTHER PUBLICATIONS

Notice of Allowance received for U.S. Appl. No. 13/316,349, mailed on Dec. 24, 2012, 8 pages.
Notice of Allowance received for U.S. Appl. No. 13/316,349, mailed on Jan. 18, 2013, 8 pages.
Notice of Allowance received for U.S. Appl. No. 13/316,349, mailed on Nov. 20, 2012, 7 pages.
Office Action received for U.S. Appl. No. 13/316,349, mailed on Aug. 21, 2012, 7 pages.
Office Action received for U.S. Appl. No. 13/316,349, mailed on Mar. 2, 2012, 8 pages.
Response to Office Action received for U.S. Appl. No. 13/316,349, filed on Jun. 4, 2012, 8 pages.
Response to Office Action received for U.S. Appl. No. 13/316,349, filed on Oct. 22, 2012, 9 pages.
Office Action received for U.S. Appl. No. 13/493,606, mailed on Dec. 4, 2012, 9 pages.
Budruk, A. et al., "PCI Express System Architecture", Copyright 2004, Mindshare, 2004, 222 pages.
Restriction Requirement received for U.S. Appl. No. 13/493,606, mailed on Sep. 12, 2012, 6 pages.
Office Action received for Taiwan Patent Application No. 96140088, mailed on Aug. 21, 2012, 7 pages of Office Action including 3 pages of English Translation.
Office Action received for Taiwan Patent Application No. 96140088, mailed on Dec. 26, 2011, 17 pages of Office Action including 9 pages of English Translation.
Notice of Allowance received for U.S. Appl. No. 11/592,341, Mailed on Jan. 10, 2011, 12 pages.
Notice of Allowance received for U.S. Appl. No. 11/592,341, Mailed on Apr. 2, 2010, 8 pages.

(56) References Cited

OTHER PUBLICATIONS

Office Action received for U.S. Appl. No. 11/592,341, Mailed on Mar. 6, 2009,10 pages.
Response to Office Action received for U.S. Appl. No. 11/592,341, Mailed on Jan. 14, 2010, 15 pages.
Response to Office Action received for U.S. Appl. No. 11/592,341, Mailed on Aug. 6, 2012, 15 pages.
Response to Restriction Requirement received for U.S. Appl. No. 11/592,341, Mailed on Dec. 5, 2008, 14 pages.
Restriction Requirement received for U.S. Appl. No. 11/592,341, Aug. 5, 2008, 5 pages.
Notice of Allowance received for U.S. Appl. No. 11/933,126, mailed on Oct. 15, 2010, 6 pages.
Office Action received for U.S. Appl. No. 11/933,126, mailed on Aug. 11, 2009, 7 pages.
Office Action received for U.S. Appl. No. 11/933,126, mailed on May 12, 2010, 6 pages.
Response to Office Action received for U.S. Appl. No. 11/933,126, mailed on Aug. 3, 2010, 12 pages.
Response to Office Action received for U.S. Appl. No. 11/933,126, mailed on Feb. 11, 2010, 16 pages.
Response to Office Action received for U.S. Appl. No. 11/933,126, mailed on Jun. 15, 2009, 8 pages.
Restriction Requirement received for U.S. Appl. No. 11/933,126, mailed on May 13, 2009, 5 pages.
Office Action received for U.S. Appl. No. 11/933,143, Jan. 13, 2010, 10 pages.
Response to Restriction Requirement received for U.S. Appl. No. 11/933,143, Sep. 21, 2009, 7 pages.
Restriction Requirement received for U.S. Appl. No. 11/933,143, Jul. 16, 2009, 5 pages.
Notice of Allowance received for U.S. Appl. No. 11/933,159, mailed on Dec. 13, 2010, 8 pages.
Office Action received for U.S. Appl. No. 11/933,159, mailed on Aug. 6, 2010, 15 pages.
Response to Office Action received for U.S. Appl. No. 11/933,159, mailed on Nov. 8, 2010, 12 pages.
Notice of Allowance received for U.S. Appl. No. 11/933,178, mailed on Jul. 26, 2011, 10 pages.
Office Action received for U.S. Appl. No. 11/933,178, mailed on Mar. 31, 2011, 6 pages.
Office Action received for U.S. Appl. No. 11/933,178, mailed on Nov. 12, 2010, 7 pages.
Response to Office Action received for U.S. Appl. No. 11/933,178, filed on Feb. 14, 2011, 5 pages.
Response to Office Action received for U.S. Appl. No. 11/933,178, filed on Jun. 30, 2011, 6 pages.
Notice of Allowance received for U.S. Appl. No. 12/861,439, mailed on Mar. 19, 2012, 7 pages.
Restriction Requirement received for U.S. Appl. No. 12/861,439, mailed on Aug. 12, 2011, 5 pages.
Response to Office Action received for U.S. Appl. No. 12/861,439, filed on Jan. 17, 2012, 5 pages.
Response to Office Action received for U.S. Appl. No. 12/861,439, filed on Sep. 12, 2011, 7 pages.
Office Action received for U.S. Appl. No. 12/883,781, mailed on Jan. 6, 2011, 10 pages.
Response to Office Action received for U.S. Appl. No. 12/883,781, filed on Sep. 23, 2011,10 pages.
Office Action received for U.S. Appl. No. 12/883,781, mailed on May 24, 2012, 16 pages.
Office Action received for U.S. Appl. No. 12/883,781, mailed on Dec. 12, 2011, 17 pages.
Office Action received for U.S. Appl. No. 12/883,781, mailed on Nov. 19, 2012, 19 pages.
Office Action received for U.S. Appl. No. 12/883,781, mailed on Jun. 23, 201,14 pages.
Response to Office Action received for U.S. Appl. No. 12/883,781, filed on Sep. 24, 2012, 10 pages.
Response to Office Action received for U.S. Appl. No. 12/883,781, filed on Mar. 12, 2012, 9 pages.
Response to Office Action received for U.S. Appl. No. 12/883,781, filed on Apr. 5, 2011, 9 pages.
Response to Restriction Requirement received for U.S. Appl. No. 13/493,606, filed on Oct. 15, 2012, 6 pages.
Notice of Allowance received for U.S. Appl. No. 13/073,149, mailed on Mar. 23, 2012, 8 pages.
Office Action received for U.S. Appl. No. 13/073,149, mailed on Sep. 28, 2012, 7 pages.
Response to Office Action received for U.S. Appl. No. 13/073,149, filed on Jan. 17, 2012, 13 pages.
Office Action received for U.S. Appl. No. 13/073,219, mailed on May 4, 2011, 7 pages.
Notice of Allowance received for U.S. Appl. No. 13/073,219, mailed on Sep. 14, 2011, 7 pages.
Response to Office Action received for U.S. Appl. No. 13/073,219, filed on Aug. 4, 2011, 5 pages.
Notice of Allowance received for U.S. Appl. No. 13/198,559, Mailed on Nov. 13, 2012, 8 pages.
Notice of Allowance received for U.S. Appl. No. 13/198,559, Dec. 20, 2012, 8 pages.
Office Action received for U.S. Appl. No. 13/198,559, Mailed on Nov. 30, 2011, 6 pages.
Office Action received for U.S. Appl. No. 13/198,559, Mailed on May 25, 2012, 8 pages.
Response to Office Action received for U.S. Appl. No. 13/198,559, filed on Aug. 27, 2012, 6 pages.
Notice of allowance received for U.S. Appl. No. 13/198,559, mailed on Feb. 27, 2013, 7 pages.
Office Action received for U.S. Appl. No. 12/883,781, mailed on Feb. 6, 2013, 19 pages.
Ex Parte Quayle Action received for U.S. Appl. No. 13/046,345, mailed on Mar. 25, 2013, 6 pages.
Restriction Requirement received for U.S. Appl. No. 13/691,016, mailed on Mar. 29, 2013, 5 pages.
Notice of Allowance received for U.S. Appl. No. 12/883,781, mailed on Jun. 7, 2013, 8 pages.
Notice of Allowance received for U.S. Appl. No. 13/046,345, mailed on Jun. 18, 2013, 8 pages.
Office Action received for U.S. Appl. No. 12/861,439, mailed on Oct. 17, 2011, 6 pages.
Notice of Allowance received for U.S. Appl. No. 13/706,575, mailed on Dec. 13, 2013, 11 pages.
Office Action received for U.S. Appl. No. 13/691,016, mailed on Jul. 24, 2013, 12 pages.
Office action received for U.S. Appl. No. 13/690,931, mailed on Aug. 29, 2013, 11 pages.
Office Action received for U.S. Appl. No. 13/706,575, mailed on Aug. 30, 2013, 19 pages.
Office action received for U.S. Appl. No. 13/493,606, mailed on Dec. 2, 2013, 9 pages.
Office Action received for U.S. Appl. No. 13/713,614, mailed on Oct. 23, 2013, 17 pages.
Office action received for U.S. Appl. No. 13,713,635, mailed on Nov. 6, 2013, 19 pages.
Office Action received for Taiwanese Patent Application No. 096140088, mailed on Aug. 5, 2013, 06 pages of Office Action including 03 pages of English Translation.
Budruk, et al, "PCI Express System Architecture", Mindshare, Chapters 1-5, Draft Cover as of Jul. 2003, Copyright 2004 (201 pages).
Budruk, et al, "PCI Express System Architecture Chapter 3-Address Spaces & Transaction Routing", PCIEX Book, Aug. 5, 1003, (48 pages; pp. 105-152).
Taiwain Office Action received for Taiwan Patent Application No. 102141586 mailed Mar. 7, 2016.

* cited by examiner

| | Device Request Access Semantics | Description | Cache Hint | Prefetch |
|---|---|---|---|---|
| 605 | Base Read | Normal Base Read Request | No | No |
| 610 | Intent to Read and Write | Device intends to read the cacheline and subsequently write to the cacheline | Yes | Yes |
| 615 | Demand Read and Pre-fetch with Intent to Read | Device intends to read the demand portion of cachelines and will subsequently read the same or additional cachelines | Yes | Yes |
| 620 | Intent to Write Back to Memory | Device request to evict cachelines from cache and write back to memory | Yes | Yes |
| 625 | Base Write | Normal Base Write Request | No | No |
| 630 | Demand Write and Pre-fetch with Intent to Write | Device intends to write to the demand portion of cachelines and intends to subsequently issue writes to additional cachelines specified in the pre-fetch | Yes | Yes |
| 635 | DiO Read (Read Current) | IOAT: Read the cachelines as specified and do not cache the entries. | Yes | No |
| 640 | DiO Write (DCA) | IOAT: DCA semantics over coherent fabric | Yes | No |
| 645 | Pre-Fetch Hints Message | Pre-Fetch hints message that carries the pre-fetch information and access hints | Yes | Yes |

FIG. 6

| Access Control Hints | Description | Applies to |
|---|---|---|
| 705 Intent to Read Only | Indicates that the device will issue cacheline reads only | Demand & Pre-Fetch |
| 710 Intent to Read & Write | Indicates that the device may issue cacheline reads or writes | Demand & Pre-Fetch |
| 715 Intent to Write Only | Indicates that the device will issue full cacheline writes | Demand & Pre-Fetch |
| 720 Evict | Indicates that the device is done (default) | Demand & Pre-Fetch |
| 725 DiO* | Indicates that the request is a DIO (IOAT) request | Demand Only |

ATOMIC OPERATIONS IN PCI EXPRESS

This application is a continuation of U.S. patent application Ser. No. 12/883,781 filed on Sep. 16, 2010, and issued as U.S. Pat. No. 8,549,183 on Oct. 1, 2013, which application is a continuation of U.S. patent application Ser. No. 11/592,341 filed Nov. 2, 2006, and issued as U.S. Pat. No. 7,949,794 on May 24, 2011.

FIELD

This invention relates to the field of interconnects and, in particular, to extensions for serial point-to-point interconnects.

BACKGROUND

Computer systems include a number of components and elements. Often the components are coupled via a bus or interconnect. Previously, input/output (I/O) devices were coupled together through a conventional multi-drop parallel bus architecture referred to as Peripheral Component Interconnect (PCI). More recently, a new generation of an I/O bus referred to as PCI-Express (PCIe) has been used to facilitate faster interconnection between devices utilizing a serial physical-layer communication protocol.

A PCIE architecture includes a layered protocol to communicate between device. As an example, a physical layer, link layer, and transaction layer form a PCIE protocol stack. The PCIe link is built around dedicated unidirectional pairs of serial point-to-point connections referred to as a lane. A link between devices includes some number of lanes, such as one, two, sixteen, thirty-two, and so-on. The current PCIE specification, base spec 1.1.

Currently, PCIe links maintain coherency with respect to processor caches and system memory. For example, a read/write to an I/O device misses a cache, retrieves a referenced element, performs a requested operation, and then immediately evicts the element from the cache. In other words, an I/O write is checked against a processor cache, but the I/O access is not cache coherent. Furthermore, uncacheable MMIO accesses are uncacheable and are also not coherent. Therefore, I/O accesses are expensive for system operation and potentially decrease processing bandwidth.

In addition, when an I/O device operates on shared memory, the device typically acquires a system wide lock, performs operations on the shared memory, and then releases the lock. Acquiring a lock in this manner potentially results in data serialization and expensive delays in association with operating on shared data with multiple processing elements. Often microprocessors provide mechanisms for multiple threads to perform atomic operations to avoid the penalty associated with locks. Yet, currently PCIe does not provide a direct ability to atomically operate on shared data.

Moreover, devices issue transactions in any order, which, in some instances, results in inefficient memory accesses, such as thrashing of pages of memory. For example, a first transaction is issued referencing a first location in a first page of memory, a second transaction referencing a second location in a second page of memory, and a third transaction referencing a third location in the first page of memory. Here, the first page is opened to service the first transaction, the first page is closed, the second page is opened to service the second transaction, the second page is closed, and then the first page has to be re-opened to service the third transaction.

As devices/components become more complex and undertake heavier workloads, power management also becomes an increasing concern. Previously, PCIe compliant devices are capable of entering a plurality of power states. However, the power states include a single active state and a plurality of different levels of an "off" state, i.e. the device consumes different levels of power but is potentially not operable.

BRIEF DESCRIPTION OF THE DRAWINGS

The present invention is illustrated by way of example and not intended to be limited by the figures of the accompanying drawings.

FIG. 6 illustrates an embodiment of a list of device request access semantics.

FIG. 7 illustrates an embodiment of a list of access control hints (ACH).

DETAILED DESCRIPTION

In the following description, numerous specific details are set forth such as examples of specific interconnects, specific packets/messages, specific fields and locations within packets/messages, specific location of logic/caches, specific caching/prefetch hints, specific power/performance metrics, etc. in order to provide a thorough understanding of the present invention. It will be apparent, however, to one skilled in the art that these specific details need not be employed to practice the present invention. In other instances, well known components or methods, such as cache logic/implementation, peripheral Component Interconnect Express (PCIe) messaging protocols, PCIe fields/packets in transactions, and other PCIe basic implementation have not been described in detail in order to avoid unnecessarily obscuring the present invention.

The method and apparatus described herein are for extending/enhancing serial point-to-point interconnect architecture. Specifically, interconnect enhancement is primarily discussed in reference to a graphic accelerator coupled to a controller hub/root controller through PCIe link. However, the methods and apparatus for extending a serial point-to-point link are not so limited, as they may be implemented on or in association with any integrated circuit device, such as any input/output device or other computer component, as well as in conjunction with any type of serial point-to-point interconnect.

Serial Point-to-Point Layered Protocol Link/Interconnect

Figure 1:
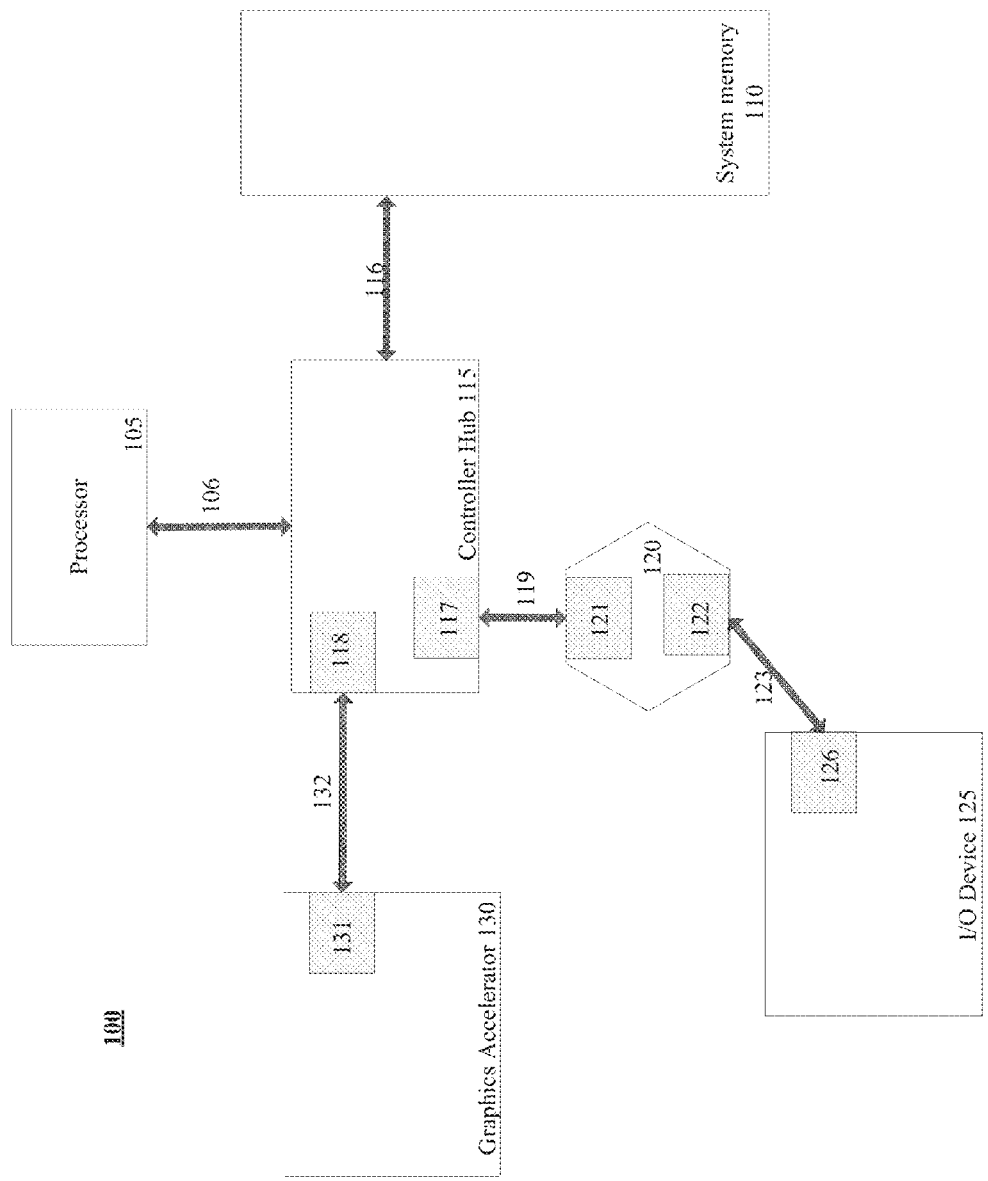
FIG. 1 illustrates an embodiment of a system including a serial point-to-point interconnect to connect I/O devices in a computer system.

Referring to FIG. 1, an embodiment of a system including devices coupled to a controller hub via a serial link is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH).

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. A module, such as modules 117, 118, 121, 122, 126, and 131, may be implemented in hardware, software, firmware, or any combination thereof. Furthermore, module boundaries commonly vary and functions are implemented together, as well as separately in different embodiments. In one embodiment, multiple devices are capable of being coupled to switch 120.

Switch 120 routes packets/messages from device 125 upstream, i.e. up a hierarchy towards a root controller, to controller hub 115 and downstream, i.e. down a hierarchy away from a root controller, from processor 105 or system memory 110 to device 125. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115.

Figure 2:
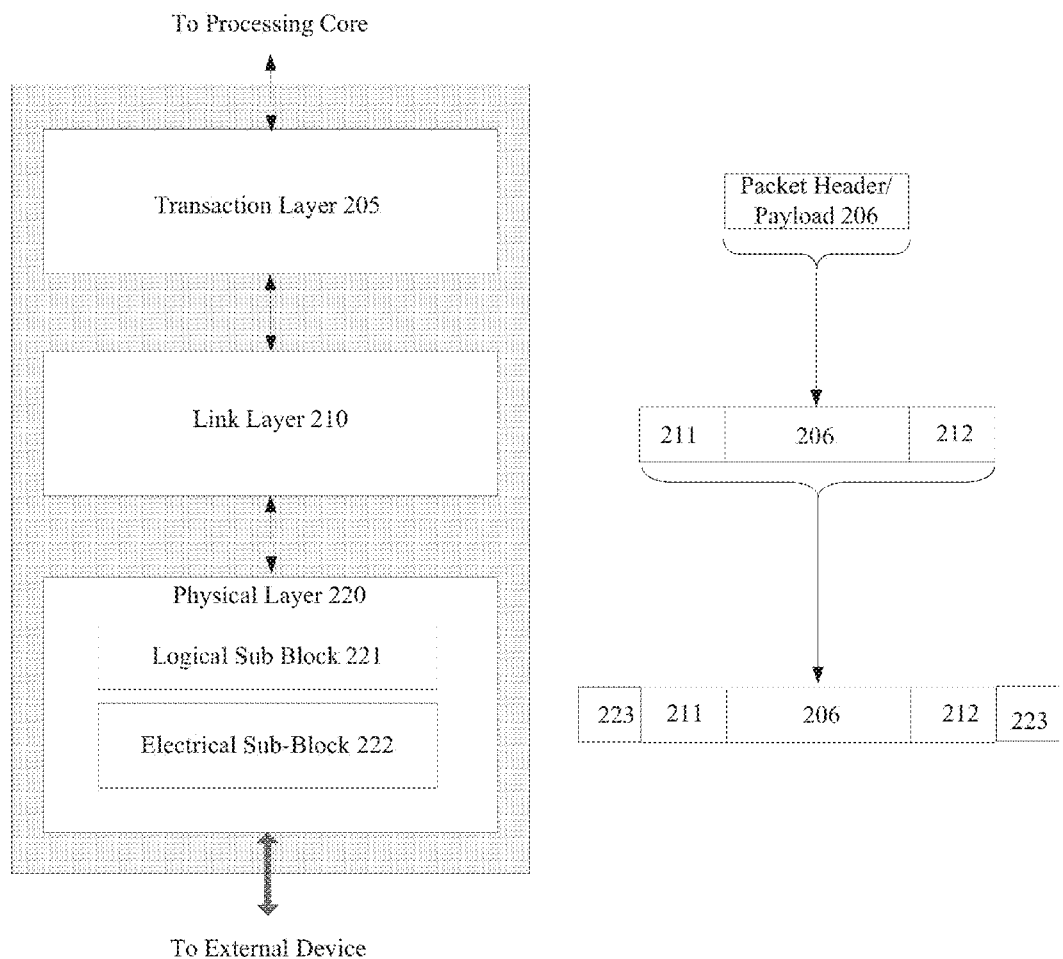
FIG. 2 illustrates an embodiment of a layered protocol stack.

Turning to FIG. 2 an embodiment of a layered protocol stack is illustrated. Layered protocol stack 200 includes any layered communication stack, such as a common standard interface (CSI) stack, PCie stack, or other protocol stack. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack is also referred to as a module or interface implementing/including a protocol stack.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for packet headers/payloads may be found in the PCIe specification, i.e. the PCIe base spec 1.1.

Figure 3:
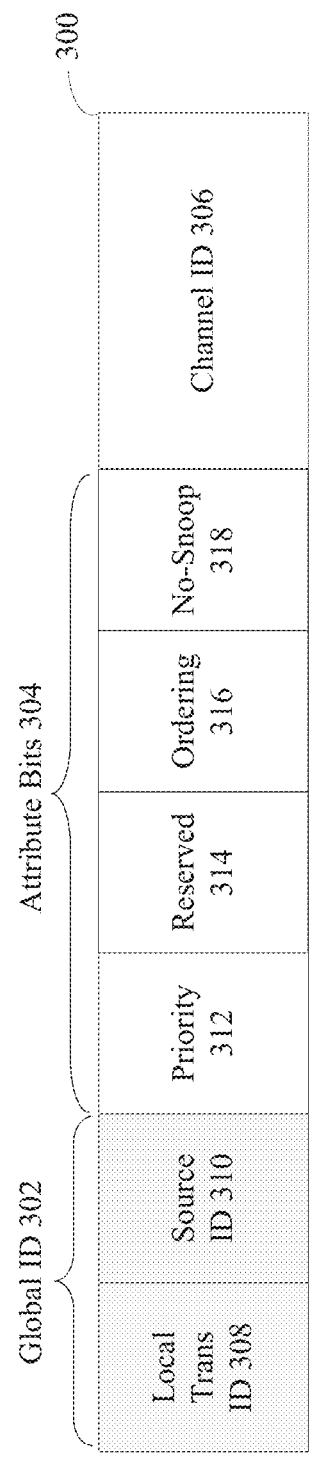
FIG. 3 illustrates an embodiment of a transaction descriptor.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8 b/10 b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
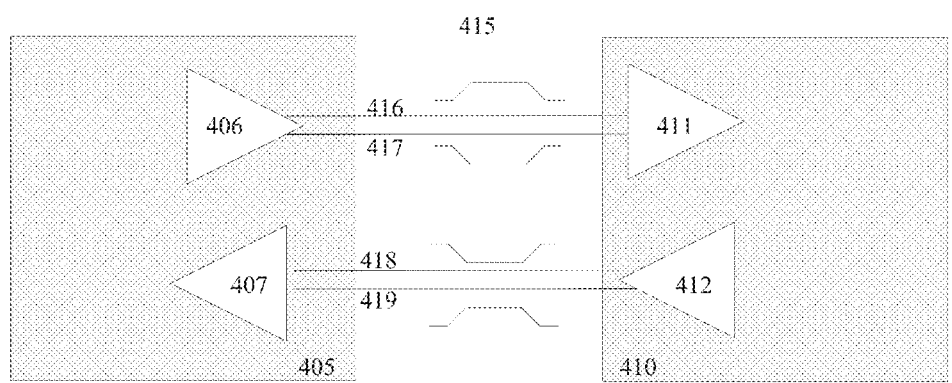
FIG. 4 illustrates an embodiment of a serial point-to-point link.

Referring next to FIG. 4 an embodiment of a PCIe serial point to point link is illustrated. Although an embodiment of a PCIe serial point-to-point link is illustrated, a serial point-to-point link is not so limited, as it includes any transmission path for transmitting serial data. In the embodiment shown, at an electrical level, two unidirectional differential pairs form a lane. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe lane.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. FIG. 4 illustrates a single lane in link 415; however, any number of lanes may be present in a link such as 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Caching and Prefetching Hints

Figure 5:
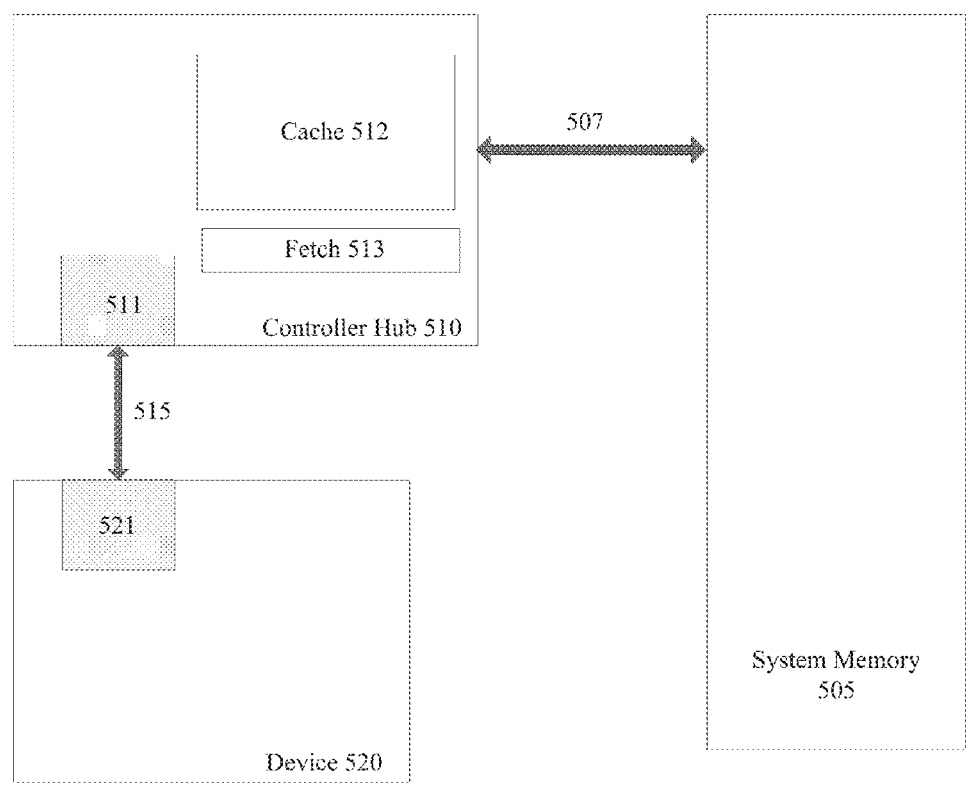
FIG. 5 illustrates an embodiment of a system including a device coupled to a controller hub through a serial point-to-point link capable of transmitting/receiving cache/prefetch hints.

Referring to FIG. 5, an embodiment of a system capable of transmitting/receiving caching/prefetching hints on a serial point-to-point link is illustrated. System memory 505 is coupled to controller hub 510 through memory interface 507. System memory 505 includes any memory accessible by device 520 through controller hub 510, such as a RAM, NVRAM, or other know memory device. As stated above, controller hub 510 includes any controller, such as an MCH, ICH, or combination thereof, which is commonly referred to as a chipset. In another embodiment, controller hub 510 is a root controller in a PCIe hierarchy.

Device 520 is coupled to controller hub 510 through serial point-to-point link 515. I/O modules 511 and 52/include, i.e. are represented as, a protocol stack. In one embodiment, the protocol stack is a PCIe protocol stack and the serial point-to-point (SP2P) link is a SP2P PCIe link. In one embodiment, device 520 is an I/O device, such as a graphics accelerator, network interface controller (NIC), and an add-in card.

Device 520 is to transmit a first packet, which is also referred to as a request, message, transaction, or other known grouping of information, over SP2P link 515. In one embodiment, the first packet includes a cache hint and/or a prefetch hint. In one embodiment, caching hints, also referred to as Access Control Hints (ACHs), potentially include temporal hints, locality hints, cache coherency hintw, element usage intention hints, or a combination thereof to influence caching policies associated with an element referenced by the first packet. According to one implementation, a prefetch hint includes any reference to an element to be fetched for potential future use. An element includes any data, instruction, grouping of bits, cache line, or other known information stored in a memory device.

Turning to FIG. 6, an embodiment of a non-exclusive list of device request access semantics associated with cache and prefetch enhancements is illustrated. Essentially, list 600 lists exemplary device requests to provide temporal and/or locality caching/prefetching hints for efficient access and execution. In line 605 a base read is listed, and in line 635 a base write is listed. In one embodiment, the base read is a normal base read request with no caching or prefetching hints, and the base write is a normal base write request with no caching or prefetching hints. In an alternative embodiment, a base read/write includes a caching hint.

In line 610 an intent to read and write indicates a device intends to read a cache line, or a plurality of cache lines, and subsequently intends to write to the cache line, or the plurality of cache lines. Here, caching hints and/or prefetching hints are included. Line 615 listing a demand read and pre-fetch with intent to read indicates that a device intends to read the demand portion of a cache line and intends to subsequently read the same cache line or an additional cache line. Again a cache hint and/or a prefetch hint is/are included. Similarly, in line 630 a demand write and prefetch with intent to write, indicates a device will write a demand portion of a cache line and intends to subsequently read the same cache line or an additional cache line.

Line 620 include an intent to write back to memory. i.e. the device requests a cache line to be evicted from a cache and written back to memory. Here, a cache hint and/or prefetch hint is/are included in the request/message. Lines 635 and 640 include a direct I/O access, i.e. a read or write, which indicates a read but do not cache and/or a write/direct cache access over a coherent fabric. Direct accesses are potentially implemented utilizing Intel® Acceleration Technology (IOAT).

In an embodiment, where prefetch hints messages are utilized, line 645, lists a prefetch message to carry prefetch information and access control hints (ACHs). As noted above, list 600 is an illustrative list of device accesses requests. Any device access request potentially includes/references a caching and/or a prefetching hint.

Turning to FIG. 7, an embodiment of access control hints (ACHs)/caching hints to be included in packet, request, and/or message is depicted. In the illustrated embodiment, five ACHs are listed: intent to read only, intent to read & write, intent to write only, evict, and direct I/O (DIO) access. Other potential hints include an intent to modify hint, an intent to writeback hint, a base read hint, a base write, and a base default hint.

Entry 705 indicates that the device intends to issue cache line reads only. As a result, a cache, such as cache 512 from FIG. 5, may cache a referenced element. In one embodiment, a cacheline caching the referenced element stores the element in an exclusive or shared state. Here, cache 512 is capable of storing cachelines in a cache coherency state, such as a Modified, Exclusive, Shared, or Invalid (MESI) state.

Entry 710, i.e. intent to read and write ACH, indicates the device may issue subsequent reads and writes to a cache line. Here, a referenced element is fetched and held in an exclusive state, as it may be modified. In contrast, entry 715, i.e. intent to write only, indicates a device will potentially write to a cacheline. In this regard, a referenced cache line is held in an exclusive state, but a new element associated with the cache line is not fetched, as the line is intended to be modified, not read.

Although any ACH may be a default ACH, entry 720 is depicted as the default ACH in this embodiment. Here, an evict ACH indicates the device is done, i.e. a referenced element/cache line may be evicted as the device does not intend to access the element/cache line in the near future. Lastly, in entry 725 a direct I/O (DIO) ACH indicates that the request is a direct I/O request, which is potentially associated with IOAT.

As indicated by the term hint, a cache or access control hint, provides an intention/hint with a request/message to potentially bias/influence caching/eviction policy. However, cache control logic is potentially capable of ignoring an ACH, i.e. performing a cache/eviction operation inconsistent with the ACH. Furthermore, as list 700 is a non-exhaustive list, any other bits/messages to influence caching/eviction policy may be included as a first hint.

Figure 8:
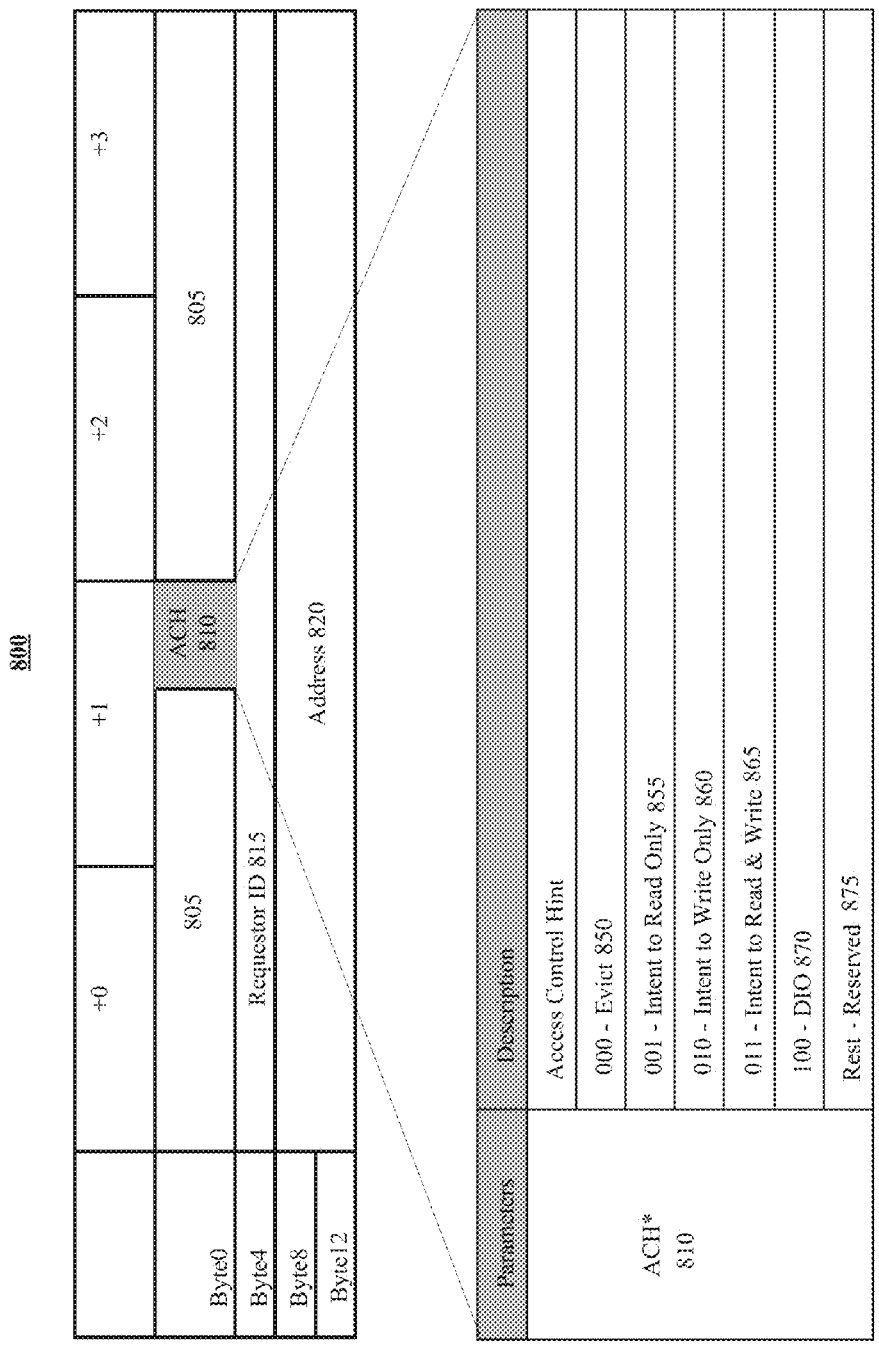
FIG. 8 illustrates an embodiment of a packet including an ACH field.

Referring to FIG. 8, an embodiment of a packet including a cache hint, i.e. an ACH, is illustrated. A packet refers to any request, message, access, or other grouping of information to be transmitted on a bus/interconnect. In the embodiment shown, packet 800 includes other information fields 805. Examples of other information 805 includes reserved fields, format fields, type fields, attribute fields, length fields, PCIe specific fields, and any other protocol specific fields. In addition, packet 800 includes requestor ID 815, which may reference a requesting agent/device and be part of a global ID/transaction descriptor or include a global ID/transaction ID, as discussed above, and address field 820 to reference an address location.

ACH field 810 is a first portion of packet 800 to include a reference to an ACH, i.e. a caching hint. As illustrated, first portion 810 includes three bits to specify an ACH; however, any number of bits may be used. Furthermore, first portion 810 may be located in any bit, byte, or other position of packet 800. As illustrated below, the ACH's listed in FIG. 7, as represented by different predetermined bit patterns in field 810. For example, a bit pattern of 000 represents evict 850 ACH, while bit pattern 011 represents intent to read & write 865 ACH. First portion field 810 may also be referred to as an opcode field, a message code field, a type code field, or other code field.

In addition to temporal hints, locality cache hints may also be included. For example, a predetermined bit pattern in ACH field 810 indicates that an element is to be cached in a root controller cache, a device cache, system memory cache, or a processor cache.

In one embodiment, packet 800 is a read/write request packet, which may be a message, a payload, and/or a header. Specifically, the read/write request packet/message/header is an enhanced/extended PCIE read/write request message/header. In this regard, ACH bits 810 may be present anywhere in a read/write request header.

Figure 9:
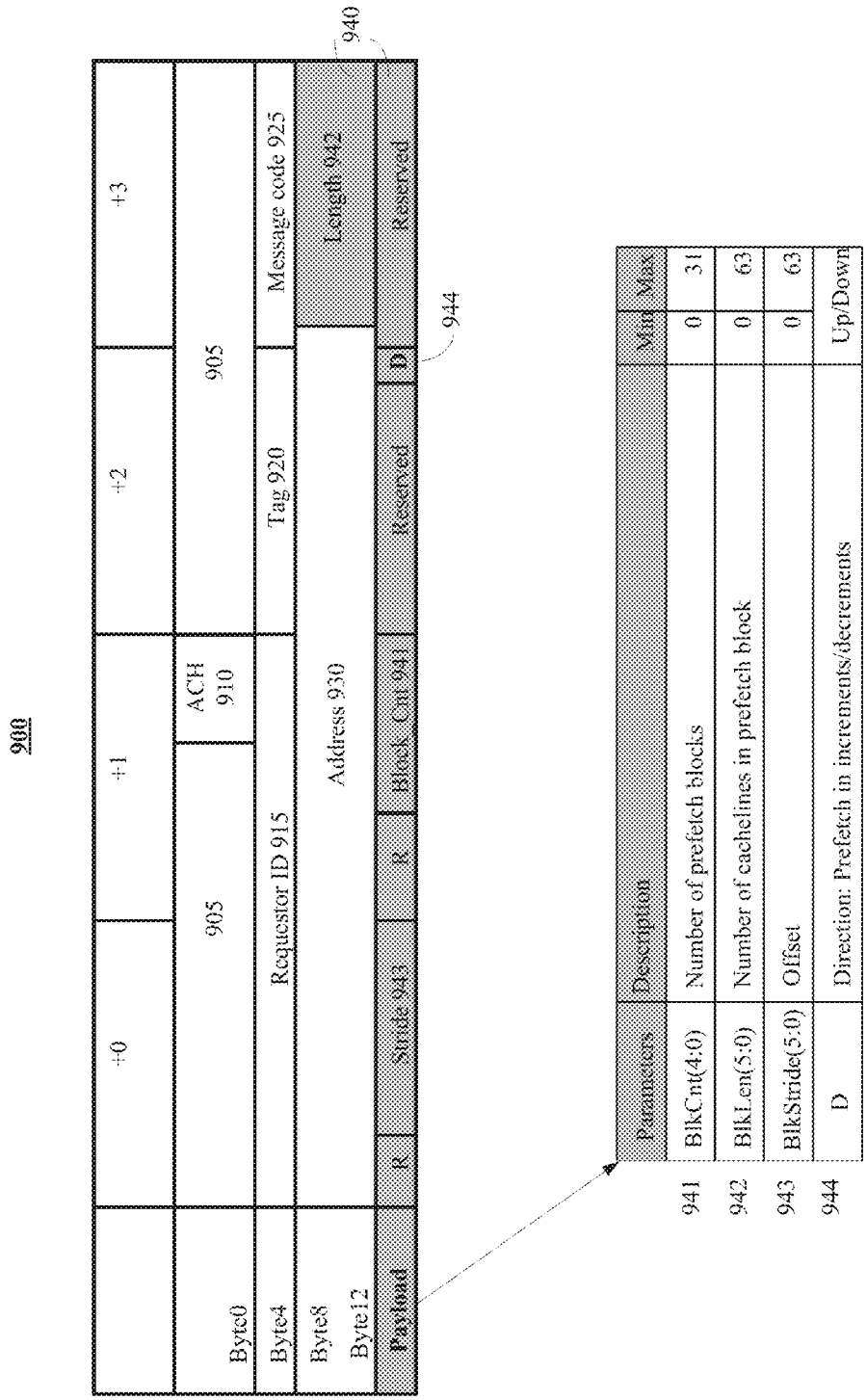
FIG. 9 illustrates an embodiment of a prefetch message.

Referring next to FIG. 9 an embodiment of a prefetch packet/message including a prefetch hint is illustrated. As in FIG. 8, packet 900 includes other info 905, ACH field 910, requestor ID 915, tag field 920, message code 925 and address field 930. Here, in addition, prefetch hint 940 is also included in packet 900. As stated above, a prefetch hint includes any reference or hint to bias/influence fetching of additional elements. In one embodiment, a prefetch is referred to as act of reading ahead and maintaining coherent copies of prefetched cache lines.

In one embodiment, a prefetch hint includes any combination of prefetch parameters, such a count, a length, a stride, an offset, and a direction. In this example, a prefetch hint includes block count field 941, length field 942, stride field 943, and direction field 944. As illustrated, length field 941 is included in address field 930, while the rest of the fields are included in payload of the packet/message. However, fields 941-944 maybe included anywhere in prefetch message 900, including being distributed between a payload and a header or fully included in one or the other.

As an illustrative example, block count field 94/includes five bits to reference a number of blocks between 0 and 31 to prefetch, block length field 942 includes six bits to reference a number of cache lines between 0 and 63 in a prefetch block, stride field 943 includes six bits to reference an offset, i.e. a number of cache lines between 0 and 63 until the start of a next block, and direction field 944 includes at least one bit to indicate and up or down direction to prefetch in.

A prefetch hint may include any other combination of fields/parameters to reference an additional element to be prefetched, such as a number of blocks within a page or an interleave bit to indicate an order to fetch additional cache line, i.e. elements, in. Furthermore, a prefetch message/hint may include some temporal use indication to indicate when a device will issue a request for a block to influence/bias a root controller cache's allocation and allocation policies.

As noted above, prefetch message 900 includes ACH field 910. Here, ACH field 910 is to store an ACH associated with the additional elements, i.e. blocks/cache lines, to be prefetched. As above, a locality hint potentially indicates where prefetched elements are to be cached and a temporal hint ACH indicates a device's access intention to bias caching actions associated with the additional elements. Consequently, prefetch packet 900, in one embodiment, includes a reference to an address, such as a starting address or other address, a prefetch hint, and an access control hint (ACH).

Figure 10:
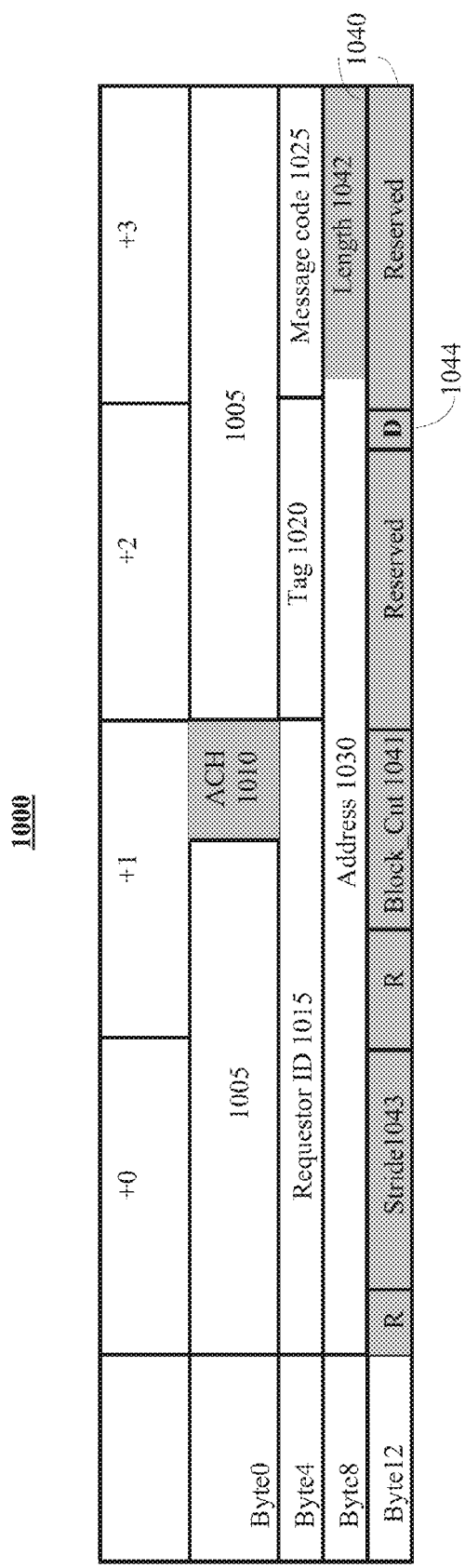
FIG. 10 illustrates an embodiment of a heading including an ACH field and a prefetch hint.

Turning to FIG. 10 another embodiment of including a cache hint and a prefetch hint in a message/packet is illustrated. Here, packet 1000 includes fields similar to packet 900, such as other information fields 1005, ACH field 1010, requestor ID field 1015, tag 1020, message code 1025, and address 1030. However, address field 1030 is a smaller size, while prefetch hint 1040, having parameter fields 1041-1044, is included within byte 12 of a header. In one embodiment, packet 1000 is a read/write request header including a cache hint and a prefetch hint.

Referring back to FIG. 5, device 520, such as a graphics accelerator, includes I/O module 521 having a protocol stack to transmit a packet including a cache hint, i.e. an ACH, as described in reference to FIGS. 6-10. In another embodiment, I/O module 521 is also to transmit a second packet, such as a prefetch message or read/write request, including a prefetch hint as described in FIGS. 6-10.

Controller hub 510, such as an MCH, is coupled to device 520 through serial point-to-point interconnect 515. I/O module 511 is to receive the first and the second packet. In one embodiment, controller hub also includes cache 512 to cache a first element in a MESI cache coherency state based on an ACH in the first packet and additional elements referenced in the second prefetch packet. Controller hub 510 may also include fetch logic 513, which in one embodiment, is included in memory interface logic, to fetch/prefetch the additional elements, if an ACH indicates the additional elements are to be fetched. For example, if an ACH represents an intent a modify only, no new data needs to be fetched, as the new data is to be modified anyway. In contrast, if the ACH represent an intent to read, then newer data is to be fetched to ensure the proper data is read.

Consequently, cache 512 essentially is an elastic buffer to manage/pipeline I/O traffic. Cache 512 may exhibit write cache, write through, and/or write-back attributes. However, cache 512 is not so limited, as it may be any style of known cache. Although not illustrated, in one embodiment bridges/switches in a PCIe hierarchy are able to pass through packets, requests, and/or messages, as well as route caching/prefetching messages to a root controller.

Figure 11:
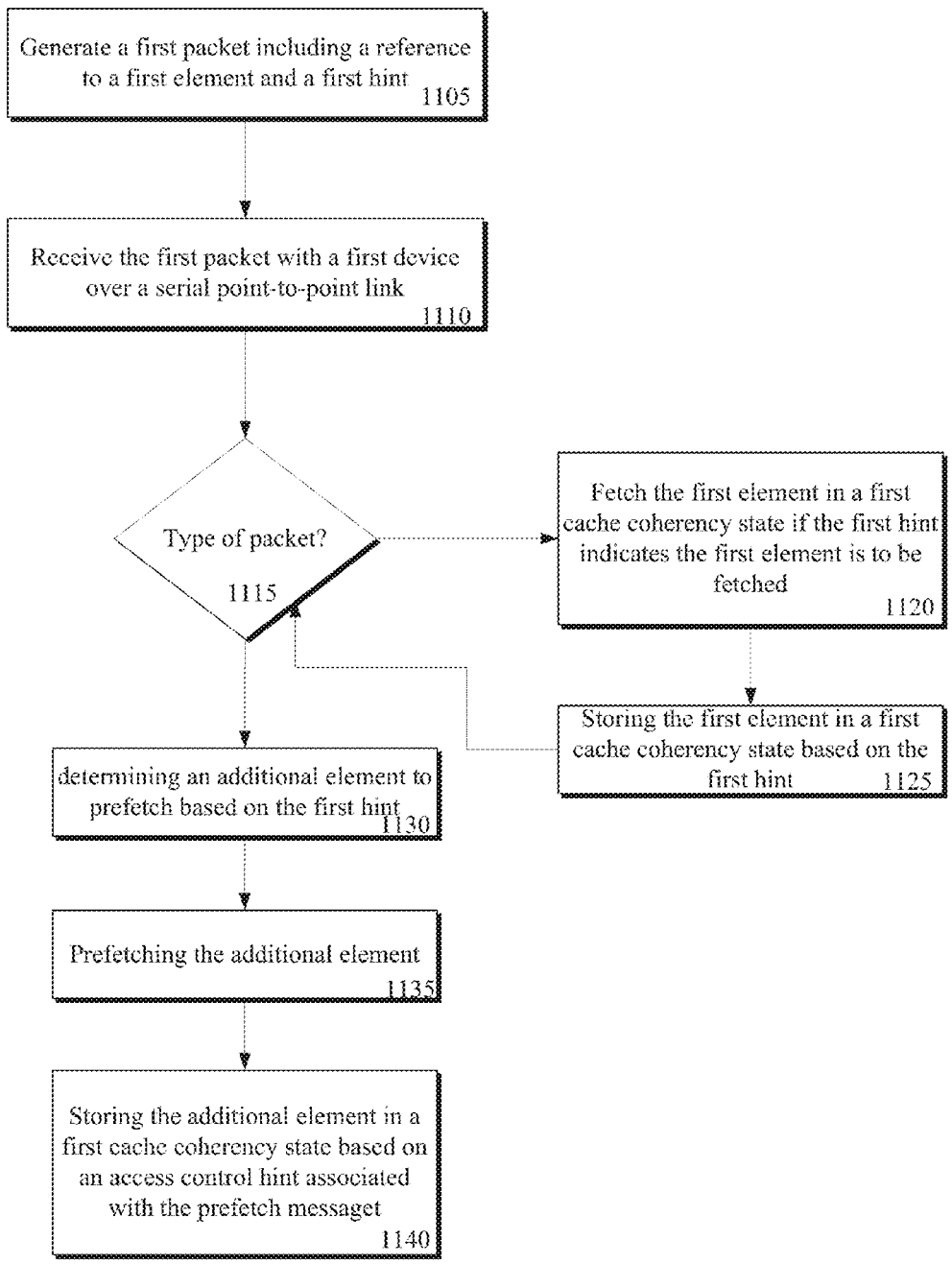
FIG. 11 illustrates an embodiment of a flow diagram for a method of providing access control and/or prefetch hints.

In reference to FIG. 11, an embodiment of a flow diagram for a method of providing access control and/or prefetch hints is illustrated. In flow 1105, a first packet including a reference to a first element and a first hint is generated. The first packet is transmitted over a serial point-to-point (SP2P) link to a first device, such as a controller hub or root controller. In one embodiment, the SP2P link is a PCIE based link. The first device receives the first packet in flow 1110.

In flow 1115, a type of the first packet is determined. In a first embodiment, the first packet is a read/write request message including an ACH. The read/write request message may also include a prefetch hint. In another embodiment, the packet is a prefetch message including a prefetch hint. A packet type may be determined by an opcode field, a message code field, or other field to specify a packet type. In addition, an ACH field and/or a prefetch hint field may be read to determine the packet type.

If the packet includes an ACH and no prefetch hint, then in flow 1120 the first element is fetched, if the ACH indicates the first element is to be fetched. In flow 1125, the first element, such as a cache line, is stored in a first MESI cache coherency state based on the first ACH.

If the message is a read/write request with an ACH and a prefetch hint, then after flows 1120 and 1125, the flow moves to block 1130. However, in one embodiment where the message is a prefetch message, then the flow may go directly to flow 1130 without passing through blocks 1120 and 1125.

In flow 1130, an additional element, or a plurality of additional elements to be prefetched is determined based on a prefetch hint. The prefetch hint includes any combination of prefetch parameters, such as a starting address, a block count, a length, a an offset, a stride, and a direction. In flow 1135, the additional element is prefetched. As above, the additional element is stored in a cache coherency state based on an ACH associated with the prefetch message.

Atomic Operations and Synchronization Primitives

Figure 12:
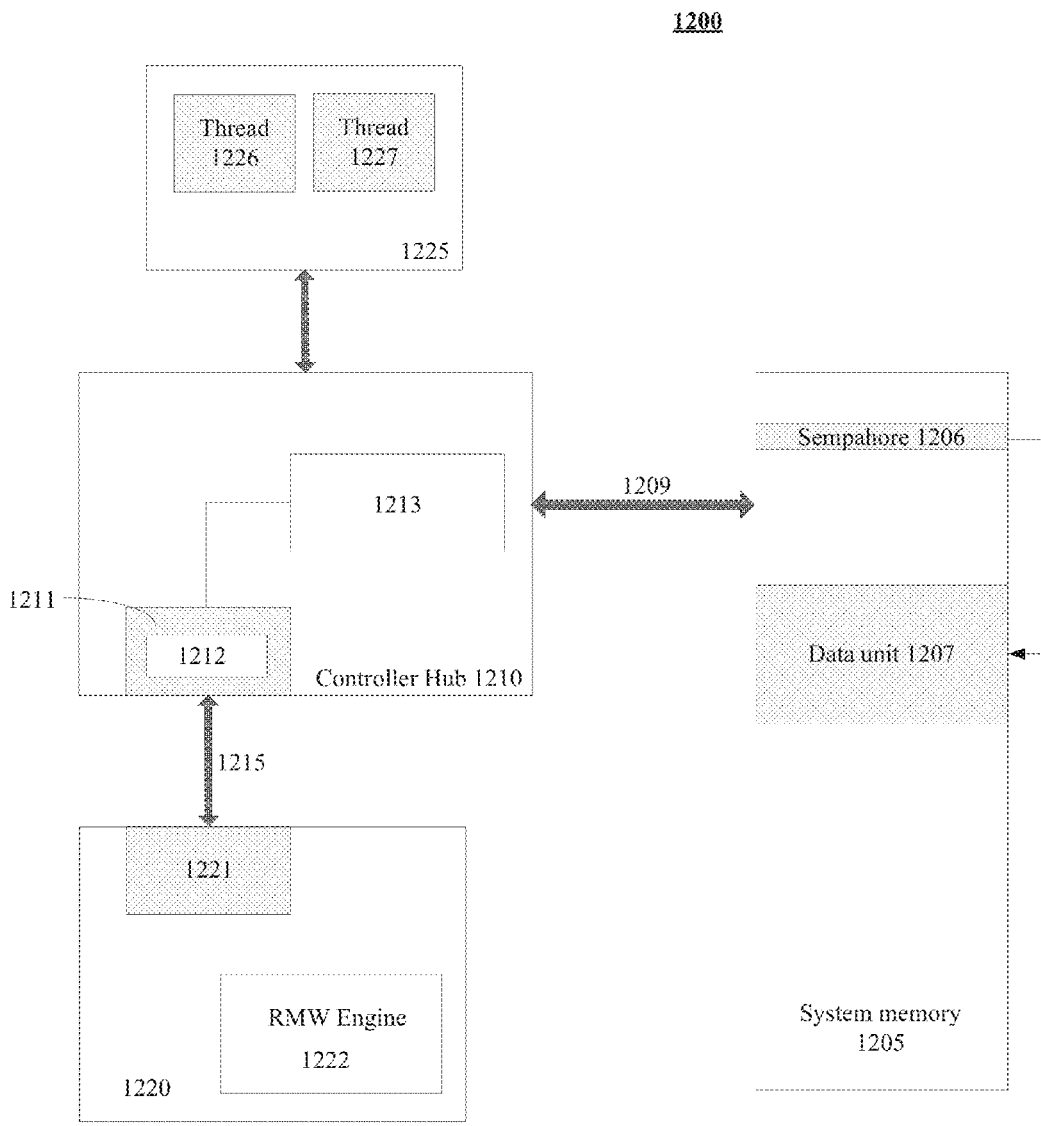
FIG. 12 illustrates an embodiment of a system capable of performing atomic operations on shared data.

Referring to FIG. 12, an embodiment of a system capable of performing atomic operations is illustrated. System 1200 allows efficient exchange of status information and semaphores through fast "ownership" exchange of data shared between multiple devices. Previously, an I/O device would acquire a system wide lock on a shared location in memory, perform operations on the shared location, and then release the lock. However, device 1220 is capable of requesting an atomic operation. In one embodiment, an atomic operation includes a read, modify, and write (RMW) to a shared memory location. In another embodiment, an atomic operation includes a read request. As an illustrative example, an atomic operation is to operate on 4B, 8B, and 16B aligned data.

As another illustrative example, RMW engine 1222 is to request/specify an atomic operation, i.e. a RMW to meta-data/semaphore 1206, to acquire ownership of data unit 1207. Data unit 1207 includes any granularity of lockable data, from a single bit, a single element, a single cache line, a block of elements/cache lines, a table, or any other granularity/grouping of data. In one embodiment, RMW engine 1222 is also to track the atomic operation, which it is outstanding. Interface 1221, which includes a layered protocol stack, is to transmit a packet/message specifying the atomic operation to controller hub 1210. Detection/decode logic 1212 in interface 1211 is to detect the atomic operation, such as through a predetermined bit pattern. Service logic 1213 services the atomic operation, i.e. RMW to location 1206. In response to completing the RMW, logic in controller hub 120 generates a response message to be transmitted over SP2P link 1215 and received by device 1220. In this regard, RMW engine retires the tracking of the outstanding atomic operation.

In one embodiment, semaphore 1206 is a shared data structure, to acquire ownership of data unit 1207. As a result, two threads, such as threads 1226 and 1227 executing on processor 1225, share access to semaphore 1206, and accordingly data unit 1207, such as a hash table or other granularity of data, with device 1220. As a result, instead of acquiring a system wide lock with device 1220, which stalls thread 1226 and 1227 from concurrently operating on data in data unit 1207, and atomic update of semaphore is serviced by controller hub 120. In other words, device 1220 is essentially treated as a co-equal thread/processor able to perform atomic operations on shared data locations. Therefore, a write to meta-data/semaphore 1206 and an exchange of the value in location 1206 is atomically completed, if a right value exists in semaphore location 1206.

Figure 13:
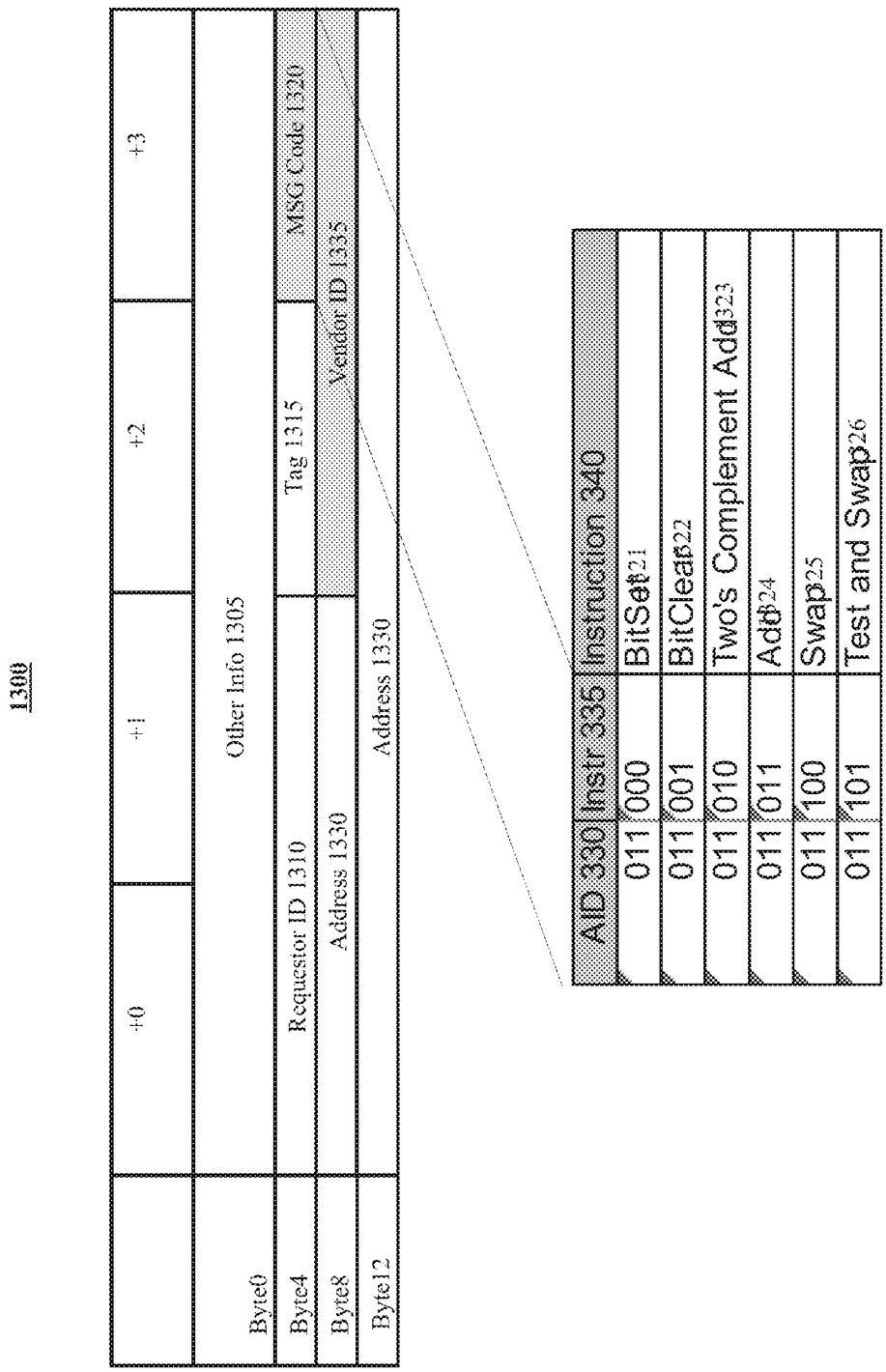
FIG. 13 illustrates an embodiment of a packet including a field to specify an atomic operation.

Turning to FIG. 13, an embodiment of a packet/request/message to specify an atomic operation is illustrated. Packet 1300 includes any message or request, such as a read/write PCIe request. As above in reference to FIGS. 8-10, any fields may be included in packet 1300, such as other information 1305, ID 1310, tag 1315, and address fields 1330. As above, ID 1310 potentially includes a transaction descriptor, a portion of a transaction descriptor, a unique transaction ID, a global ID, an agent ID, a local ID, or combination thereof. As IDs are utilized to track outstanding atomic operation, as discussed below, a device, such as device 1220 may generate multiple outstanding atomic operations.

Also included in packet 1300 is message code 1320. Message code 1320 is to specify an atomic operation. In one embodiment, message code 1320 is an opcode to be recognized/detected by detection logic, such as detection logic 1212. Alternatively, an opcode field is included in packet 1300, such as in other info field 1305, to identify a request or message, such as a read/write request. In this example, message code 1320 is potentially a separate field to be detected/decoded by detection/decode logic 1212. Message code 1320 may also be referred to as a type field or other known predetermined bit field.

In one embodiment, second portion 335 of message code 1320 specifies an instruction and first portion 330 indicates if the instruction is atomic. An illustrative example of the second portion being appended to the first portion is depicted in FIG. 13. Here, Atomic identifier (AID) field 330 indicates an instruction referenced in instruction field 335 is atomic, if bits in field 330 include a predetermined bit pattern of 011. In AID field 330 includes any other bit pattern, then the associated instruction is determined to not be atomic. Instruction field 335 identifies an instruction, such as BitSet instruction 321, BitClear instruction 322, Two's complement Add instruction 323, add instruction 324, swap instruction 325, and test and swap instruction 326.

In an embodiment where an atomic operation includes RMW operations, any instruction capable of RMW may be used as an atomic instruction. In contrast, in an embodiment where atomic operations include reads, any read instruction may be utilized. As a result, FIG. 13 depicts an illustrative non-exhaustive list of potential atomic operations, which may be modified. In another embodiment, packet 1300 includes vendor ID field, which is potentially used to ID a vendor or allow for a vendor specified identification.

Referring quickly back to FIG. 12, RMW engine 1222 requests/specifies an atomic operation. An ID, such as a global ID, transaction ID, or other unique ID is used to track outstanding atomic transactions. For example, an entry in a data structure, such as a queue, stack, or linked list, tracks a status of an atomic transaction. In one embodiment, RMW engine 1222 allocates space in a device, such as in local memory and/or the data structure, for an atomic transaction response before issuing an atomic transaction. Once an atomic transaction is serviced, i.e. completed, a response message is generated and received by the initial requesting device, i.e. device 1220. The response message is to include a unique ID, which may be used both to route the message back to device 1220 and to locate/retire an outstanding atomic transaction in the data structure.

Figure 14:
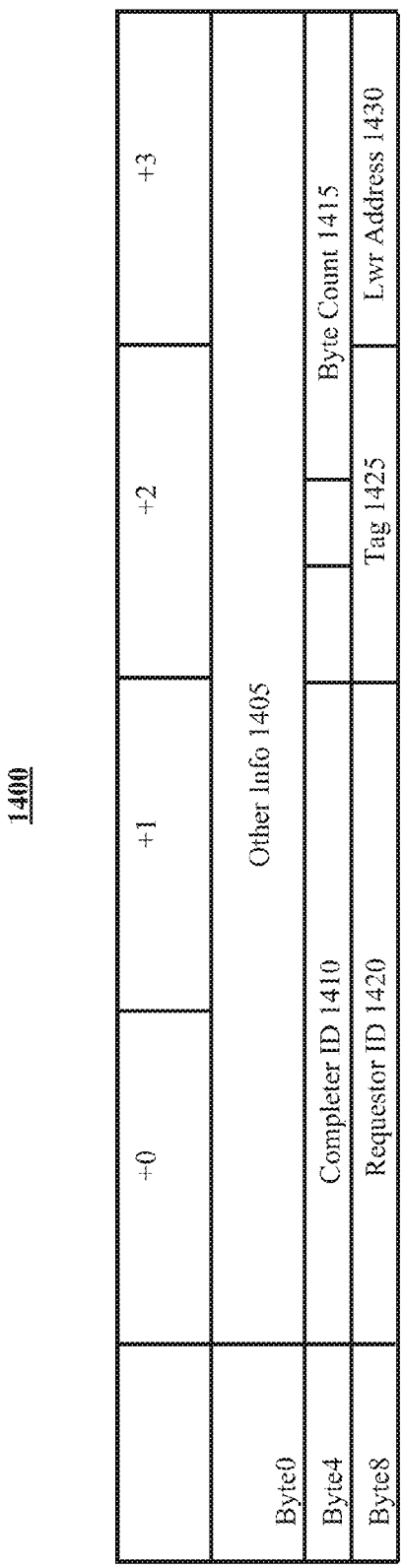
FIG. 14 illustrates an embodiment of an atomic operation response packet.

Turning over to FIG. 14, an embodiment of a response message is illustrated. As above, response message 1400 may include other information 1405, such as other information in a PCIE response message. In addition, response message 1400 is depicted as including completer ID 1410 to identify a completing agent, byte count 1415 to reference a byte count, requestor ID 1420, tag 1425, and lower address 1430. A unique ID associated with the atomic transaction is included in response 1400. As an example, the unique ID is includes a combination of the depicted IDs or is within a depicted ID field. However, a unique ID may be located anywhere in response 1400. As another example, a portion of a transaction descriptor, a transaction descriptor, a global ID, a local ID, or other ID, as described above, is included in response 1400.

In one embodiment, response 1400 is generated in response to servicing an atomic operation. In this regard, an initial or old value is returned with response message 1400. As an example, an atomic operation is specified in a read write request generated by a graphics accelerator. The atomic operation is to perform a RMW on a first memory location. The read/write request is received by a controller hub including a layered protocol stack. The first memory location is read to return a value of 0, the value of 0 is modified to a 1, and the 1 is written to the first memory location. Response message 1400 includes a unique atomic transaction ID and old/initial value 0. When the response message 1400 is received by the graphics accelerator, it is retired from a data structure tracking the atomic transaction as outstanding through reference to the unique atomic transaction ID.

In one embodiment, service logic, such as service logic 1213 includes any logic to service an atomic transaction. For example, service logic includes logic to perform a read of a first value from a memory location, a modify of the first value to a second value, and a write of the second value back to the first memory location. An RMW may also be referred to as an exchange, a compare and exchange, and a test and exchange.

Figure 15:
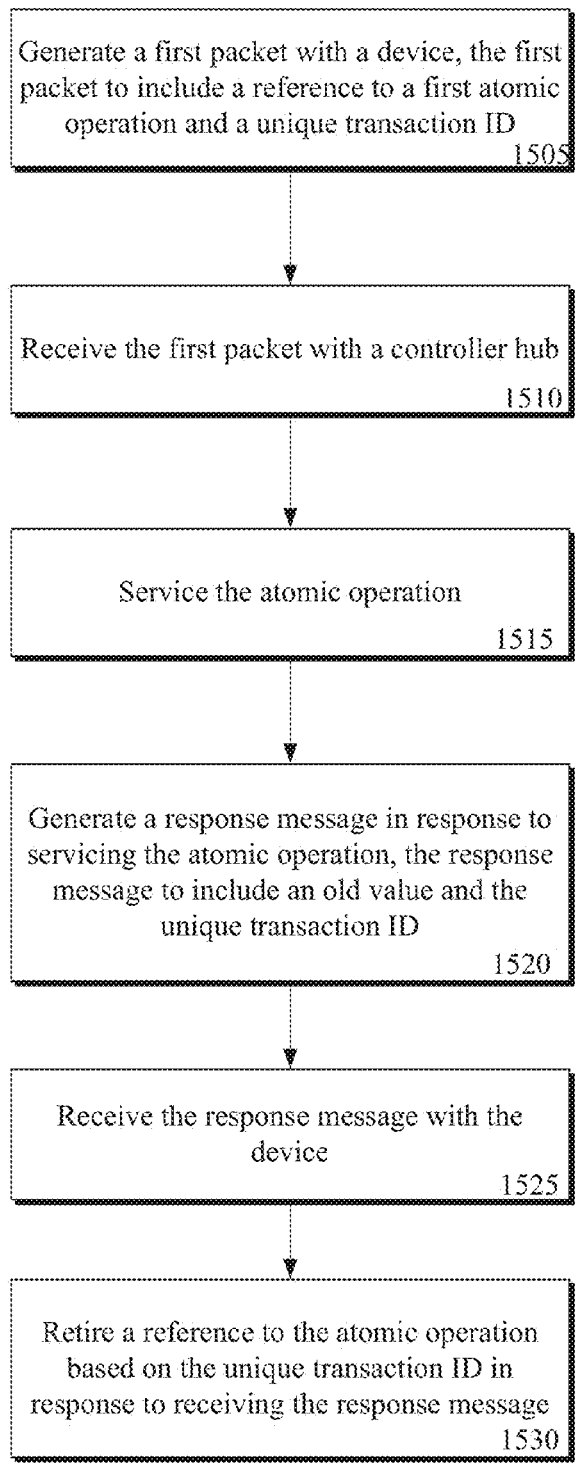
FIG. 15 illustrates an embodiment of a flow diagram for performing an atomic operation.

Referring next to FIG. 15 an embodiment of a flow diagram for performing an atomic operation is illustrated. In flow 1505, a first packet is generated with a device. The first packet is to include a reference to the first atomic operation and a unique transaction ID. In one embodiment the device includes a graphics accelerator. Furthermore, the reference to the first atomic operation includes a reference to an atomic instruction, such as BitSet, BitClear, Two's Complement Add, Add, Swap, and Test & Swap.

In another embodiment, the device stores a reference to the unique transaction ID for tracking purposes. Moreover, as an example, space is allocated for a response message to the first packet before issuing the first packet. The first packet is then transmitted using a layered protocol stack to a controller hub over a SP2P link. Note that the first packet may be transmitted over a plurality of SP2P links and routed through bridges/switches to reach a controller hub, such as a root controller hub.

The first packet is received with the controller hub through a layered protocols stack in flow 1510. The controller hub detects the reference to the atomic operation. In one embodiment, a predetermined bit pattern specifies the atomic operation from the atomic operations mentioned above. In flow 1515, the atomic operation is serviced. In an embodiment, where an atomic operation includes an atomic RMW, the RMW is performed atomically.

Next, in flow 1520 a response message is generated in response to servicing the atomic operation. Here, the response message is to include an old value and a reference to the unique transaction ID. In one embodiment, the old value is a value read while servicing the atomic transaction. The response message is transmitted back to the device. In regards to this, a unique transaction ID, which references an original requestor, i.e. the device, is potentially used to route the response message back to the correct device.

In flow 1525 the response message is received by the device, and in flow 1530 the reference to the atomic operation is retired based on the unique transaction ID. Essentially, the reference to the unique ID stored in the device for tracking purposes is retired, as the response message indicates the atomic operation associated with the unique ID has been serviced.

Loose Ordering

Figure 16:
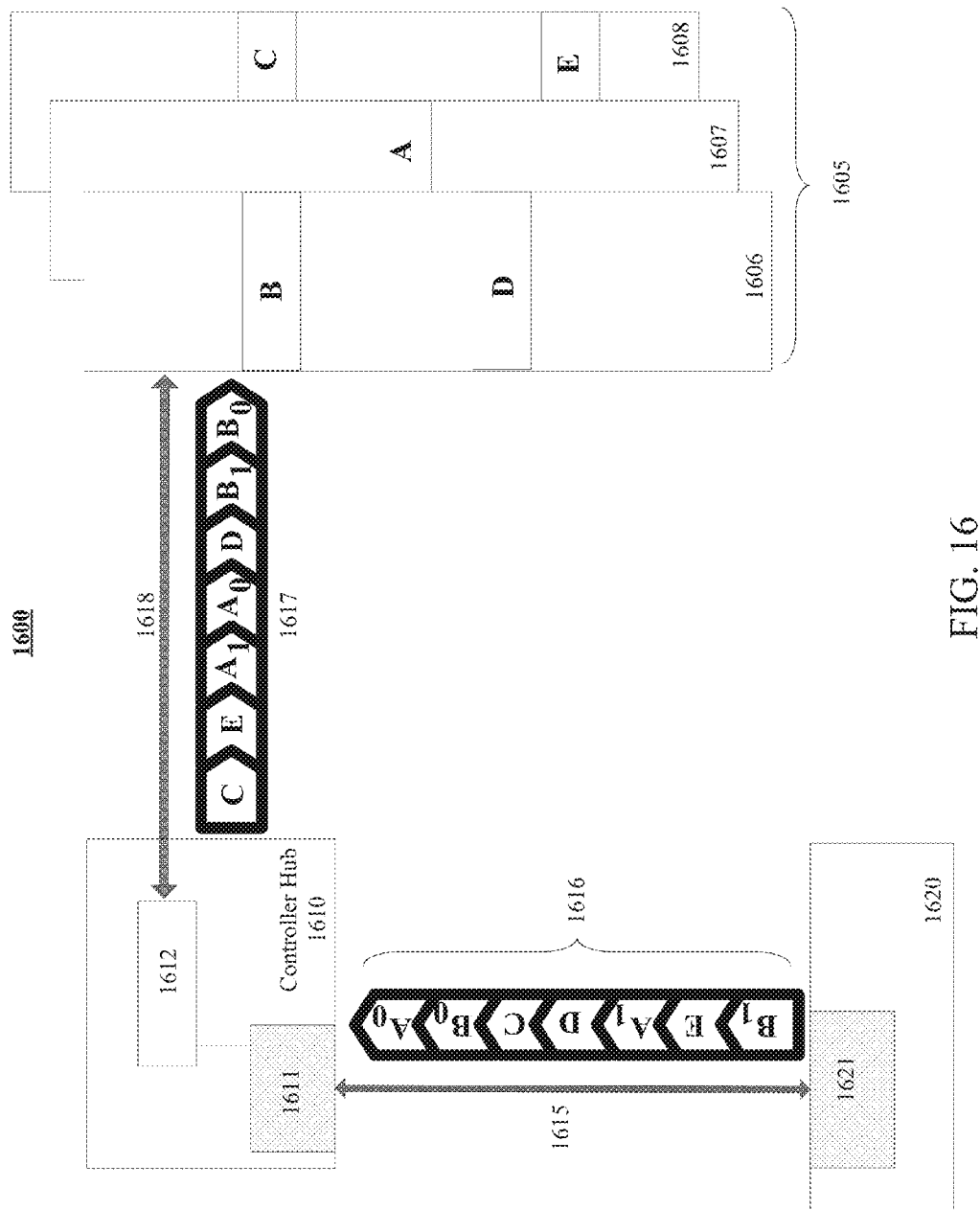
FIG. 16 illustrates an embodiment of a system capable of re-ordering issued transactions for efficient memory access.

Referring to FIG. 16, an embodiment of re-ordering transactions is illustrated. System memory 1605 is often logically broken up and accessible in pages to more efficiently manage/access memory. As a result, system memory 1605 is illustrated as broken into pages 1606-1608. Page 1606 includes memory locations B and D, page 1607 includes memory location A, and page 1608 includes memory locations C and E.

Device 1620 generates a first number of transactions. Transactions 1616 are transmitted through a protocol stack in interface 1621 on SP2P interconnect 1615. I/O module 1611 in controller hub 1610 receives transactions 1616 in a first order. As illustrated, the second transaction in the first order references memory location B in page 1606, as denoted by $B_0$, while the eighth and the last transaction in the first order also references location B, as denoted by $B_1$. Other transactions in the first order are represented similarly.

Controller hub 1610 also includes re-order logic 1612 to re-order transactions 1616 to second order 1617. In one embodiment, re-order logic 1612 is included in a core of controller hub 1610. However, reorder logic 1612 may be included anywhere in controller hub 1610, including I/O module 1611. Furthermore, transactions 1616 maybe re-ordered from an original order in protocol stack 1621, on interconnect 1615, and/or by logic in protocol stack 1611.

Re-order logic 1612 is to order first number of transactions 1616 to second order 1617, which is different than the first order, based at least in part on maintaining priority of a plurality of corresponding transactions. In one embodiment, corresponding transactions include transactions that refer to the same memory location, such as a first transaction and a second transaction that reference a first memory location. In this regard, transactions $A_0/A_1$ and $B_0/B_1$ are corresponding transactions, as they reference the same memory location. Other factors may be used to determine corresponding transactions, such as sequential ordering or other addressing techniques.

In one embodiment, maintaining priority includes not allowing a first transaction of a plurality of corresponding transactions to be ordered after a second transaction of the plurality of corresponding transactions in the second order, where the first transaction precedes the second transaction in the first order. In other words, not allowing a plurality of corresponding transactions to pass each other. Or, not ordering a first transaction, which preceded a second transaction in the first order, subsequent to the second transaction in the second order For example, transaction $B_0$ is issued before, i.e. preceding, $B_1$, in the first order. In second order 1617 $B_1$ is not allowed to pass $B_0$, as demonstrated by $B_0$ being placed before $B_1$ in the second order. From a relative perspective of the memory location, such as memory location B, $B_1$ cannot be ordered to access location B before $B_0$ does. Logically, if $B_1$ is a write to a location B that is to occur after $B_0$ reads from location B, if $B_1$ is serviced first, then inaccurate data would be read by servicing $B_0$ second.

However, in one embodiment any other combination of factors, such as efficient access to pages, access pattern, sequential addressing, and service time are used to determine the second order. For example, if the first order is executed verbatim, page 1607 is opened to service transaction $A_0$, page 1607 is then closed, page 1606 is opened to service transaction $B_0$, page 1606 is then closed, page 1608 is then opened to service transaction C, page 1608 is closed, and page 1606 is reopened to service transaction D. This inefficient page access may be referred to as thrashing, when accesses alternate between pages.

As a result, second order 1617 accounts for efficient page access in that, page 1606 is opened to service transactions $B_0,B_1$, and D, page 1606 is closed and page 1607 is opened to service transactions $A_0$ and $A_1$, and then page 1607 is closed and page 1608 is opened to service transactions E and C. Here, pages are efficiently accessed to save on access/service time. Service logic to perform/service the transactions may also be included in controller hub 1610.

Figure 17:
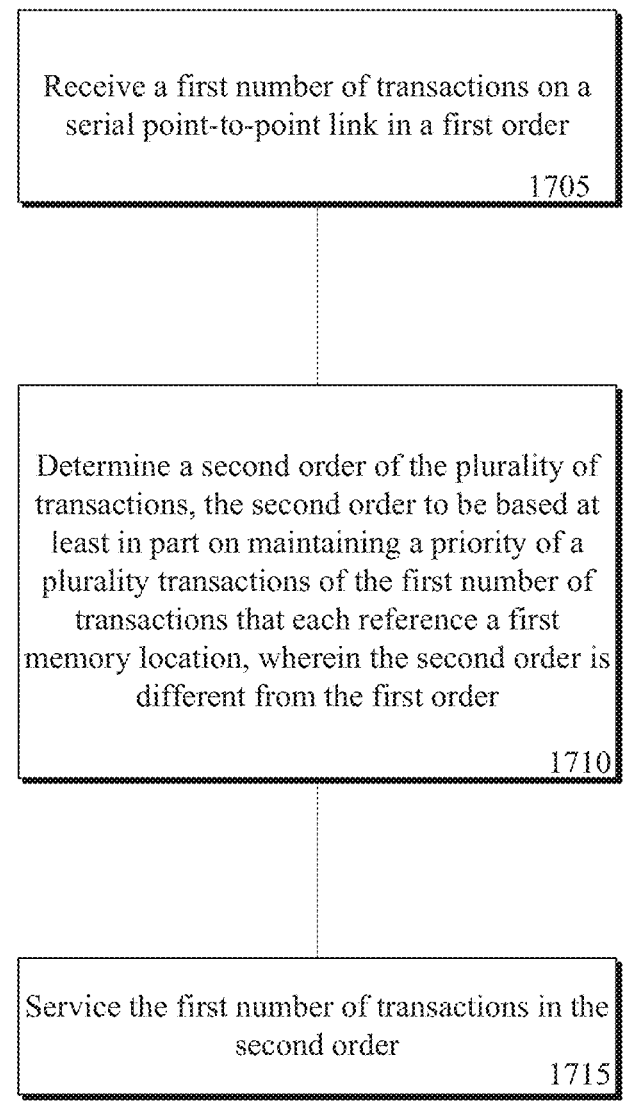
FIG. 17 illustrates an embodiment of a flow diagram for re-ordering transactions.

FIG. 17 depicts an embodiment of a method for loosely ordering transactions. In flow 1705, a first number of transactions are received on a serial point-to-point link, such as a PCIE link. In flow 1710, a second order of the plurality of transactions is determined. In one embodiment, the second order is to be based at least in part on maintaining a priority of a plurality transactions of the first number of transactions. The plurality of transactions corresponding, i.e. each of them reference a first memory location.

In one embodiment, maintaining a priority of the plurality of transactions includes not allowing a first transaction of the plurality of transactions to be ordered after a second transaction of the plurality of transactions in the second order. Here, the first transaction precedes the second transaction in the first order, so the second transaction is not allowed to pass the first transaction in the second order. In one embodiment, the second order is different from the first order the first number of transactions is received in. Furthermore, in another embodiment, the second order is also based at least in part on an additional parameter selected from a group consisting of an access pattern, sequential addressing, and a service time, i.e. how long it will take to service the transaction from an estimate or past access. Next in flow, 1715 the transactions are serviced in the second order, i.e. the transactions are performed.

Performance/Power Active Sub-States

Figure 18:
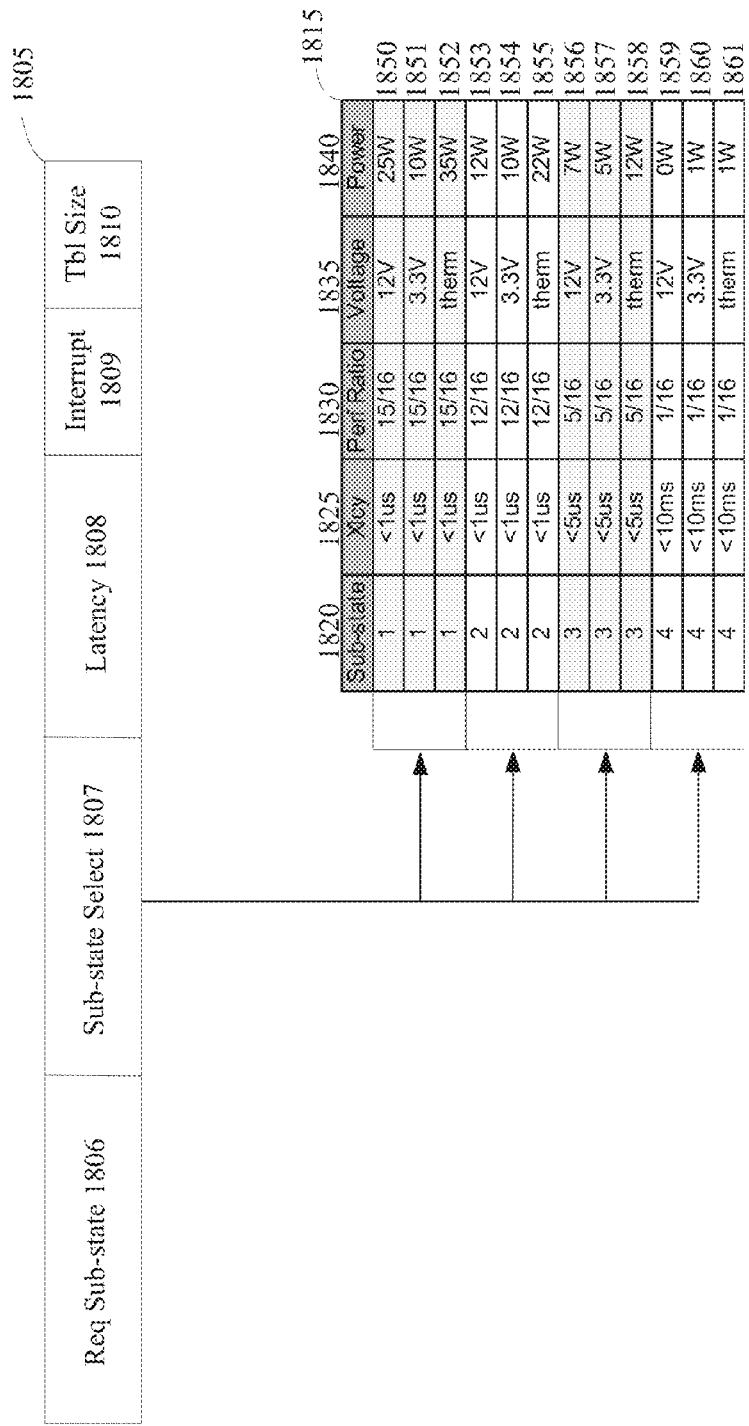
FIG. 18 illustrates an embodiment of a storage element to set a power state and a table to associate power states with power and performance metrics.

Turning to FIG. 18, an embodiment of active power sub-states associated with performance and power metrics in a device is illustrated. In one embodiment, table 1815 stores power states associated with performance and power metrics. In one embodiment, table 1815 is made up of a plurality of storage elements in a device. For example, 12 configuration registers in a device store entries 1850-1861.

In one embodiment, the power states are active power sub-states. Here, in each active sub-state, a device is able to perform I/O tasks; however, each active sub-state is associated with different power and performance metrics to consume different levels of power or operate at different levels of performance. In contrast, non-active power states are potentially associated with different power consumption levels; however, the non-active power states typically included different levels of "off", where an I/O device is not able to perform I/O operations or other primary functions.

In the example illustrated, table 1815 includes four active power sub-states, i.e. sub-states 1-4. However, any number of sub-states, such as seven, may be associated with performance and power metrics in table 1815. As an example, sub-state 1, in entry 1850, is associated with a transition latency less than 1 us in column 1825, a performance ratio of 15/16 in column 1830, a voltage of 12V in column 1835, and a power of 25 W in column 1840. Note that there are three entries per active power-sub-state in FIG. 18, such as entries 1850-1852 for sub-state 1. Here, a voltage value of 12V and 3.3V represents a maximum voltage value for two voltage rails of 12V and 3.3V in column 1835, while a thermal value, is represented in entry 1852. In another embodiment, a fourth entry per sub-state includes a third voltage value for a third voltage rail. As an example, a third max voltage for a third rail is 1.8V.

The transition latencies listed in column 1825 may represent any latency associated with a power state. Examples of transition latencies include a transition latency into an active sub-state from a maximum power state, a transition latency out of the active sub-state to another power state, a transition into the active sub-state from a previous active sub-state, and a transition out of the active sub-state into a next active sub-state. Also note, that these values may be relative or absolute.

For example, a transition latency of less than 5 us for active sub-state three in entries 1856-1858, in one embodiment, represents an absolute transition latency. In this regard, column 1825's fields represent a transition latency out of active sub-state 3 to a maximum active sub-state, such as sub-state 1, or a minimum sub-state, such as 4, a transition latency into the maximum or minimum sub-state from active-substate 3, or a combination thereof. Alternatively, as illustrated, fields in column 1825 represent relative transition latencies. For example, less than 5 us in entries 1856-1858 represent a transition latency of less than 5 us for transition out of active sub-state 3 into active sub-state 2, for transition into active sub-state 2 out of active sub-state 3, or a combination thereof.

In this later example, when in sub-state 1, values in fields 1825 are added to determine a transition latency for transitioning into a lower active power sub-state. To illustrate, a transition from sub-state 1 to sub-state 4 includes a latency of <1 us+<5 us+<10 ms. In contrast, table 1815 may be constructed to represent transition latencies from a minimum active power sub-state, such as 4, up to a maximum power sub-state of 1. Here, entries 1859-1861 include smaller transition latencies from a minimum low power state then entries 1850-1852, which would include higher transition latencies.

It is also worth noting, that some data fields, such as fields in columns 1820, 1825, and 1830 are repeated within the three entries for an active sub-state. In one embodiment, these values are different. In another embodiment, table 1815 is stored as a 2-dimensional word array or other data structure to minimize repeated fields between active sub-state entries.

As stated above, table 1815, which may be represented as any data structure, such as a list, an array, a 2-d array, a multi-dimensional array. or other known data structure, is to associate a performance metric and potentially a power metric with an active power sub-state. Examples of a power metric include: a maximum voltage value, a minimum voltage value, an absolute voltage value, a maximum power consumption value, a minimum power consumption value, and an absolute power consumption value, and a vendor defined power metric. Examples of a performance metric include a sub-state performance value, an operational frequency value, a sub-state operational unit value, a sub-state thermal value, a sub-state transition latency value, a fractional value of maximum performance, a number of sub-units to be active, a fractional number of pipelines to be active, a thermal value, a voltage, a vendor defined performance value, and a device defined performance value.

Although listed separately, power and performance metrics are not always mutually exclusive. For example, if a graphics accelerator has four pipelines/sub-units, a performance value to indicate how many of the four pipelines/sub-units are to be activated also affects power consumption, as the power consumption for 1 active pipeline is likely less than the power consumption of 4 active pipelines. Note a sub-unit may include any function unit of a device, such a pipelines, queues, logical blocks, functional blocks, or other potential sub-units.

Also illustrated in FIG. 18 is second storage element 1805. In one embodiment, second storage element 1805, as well as entries 1850-61, are configuration registers in a configuration space of a device. Storage element 1805 is to receive a write to set/request/select an active power sub-state. In another embodiment, register 1805 is also potentially written to set an inactive power state.

Typically a write is received from an external agent or software. However, in one embodiment, a device is able to write to its own register 1805 to set a power state. Often devices setting power states is not advantageous, as they typically do not have a view of system power consumption. However, in one example, when a maximum active power state is requested/set, a device may set a lower active power state, as long as a transition latency or other performance/power metrics do not affect performance drastically. For example, if a requested sub-state of 1 is written to field 1806, a device, in this example, may select sub-state 2 in field 1807, as it consumes less power/thermal budget than maximum active sub-state 1. However, a device may not be able to select active sub-state four in field 1807, as a transition latency of <10 ms and/or a performance ratio of 1/16 is deemed too low. In another embodiment, a device is able to set any active power sub-state.

However, more typically, when an interrupt field, such as field 1809 is set, interrupt requests from the device are enabled to request a change to the active sub-state. Here, a device generates an interrupt to request an active sub-state change. Firmware or another external agent traps the interrupt and writes back to register 1805 to set the requested active sub-state. In one embodiment, the write back to register 1805 is to set field 1806 to the requested sub-sate. In another embodiment, the device writes the requested sub-state in field 1806 and the write-back is to set sub-state select field 1807.

Therefore, in response to setting the sub-state request field 1806 and/or sub-state select field 1807, the device is then set to the selected active power sub-state by setting the power and performance metrics associated with the selected sub-state in field 1807. For example, if sub state select 1807 is set to active sub-state 2, then the metrics in entries 1853-55 associated with sub-state 2, such a performance ratio of 12/16, are set. As above, latency 1808 may include any transition latency, including a latency to transition in and/or out of a requested sub-state to/from a selected sub-state. In addition table size field 1810 may include a number of entries, a number of fields, or other size measure of table 1815.

Although not illustrated, a system power management module, which may include power management software, a power management controller, or other logic, firmware, or software in a system is to set a power consumption limit for a device. In one embodiment, the power consumption limit is based at least in part on any combination of factors, such as a total amount of power available to a system, a total amount of heat capable of being dissipated by the system, an amount of current power consumption of the device, an amount of heat currently generated by the device, a current active state of the device, a workload of the device, an interrupt request from the device to change to an active sub-state, a current operating frequency of the device, and a number of sub-units in the device that are active.

In this regard the system power management module is to comprehend system wide power and performance issues. For example, a system power management module (SPMM) is able to measure or read an amount of power able to be generated for the system by a power supply. Based on the total power, workloads of devices, such as processors and I/O devices, and requested power states of the devices, the system power management module sets power/performance consumption limits for each device. If a request for a power state above a set limit for a device is requested, the power state change request is potentially denied. An SPMM may also comprehend other system factors, such as a total amount of heat capable of being dissipated in a system. As a result, the SPMM is to write to storage element 1805, the write referencing an active sub-state, which is based on the power consumption and/or thermal limit for the device and/or a system the device is included within.

Figure 19:
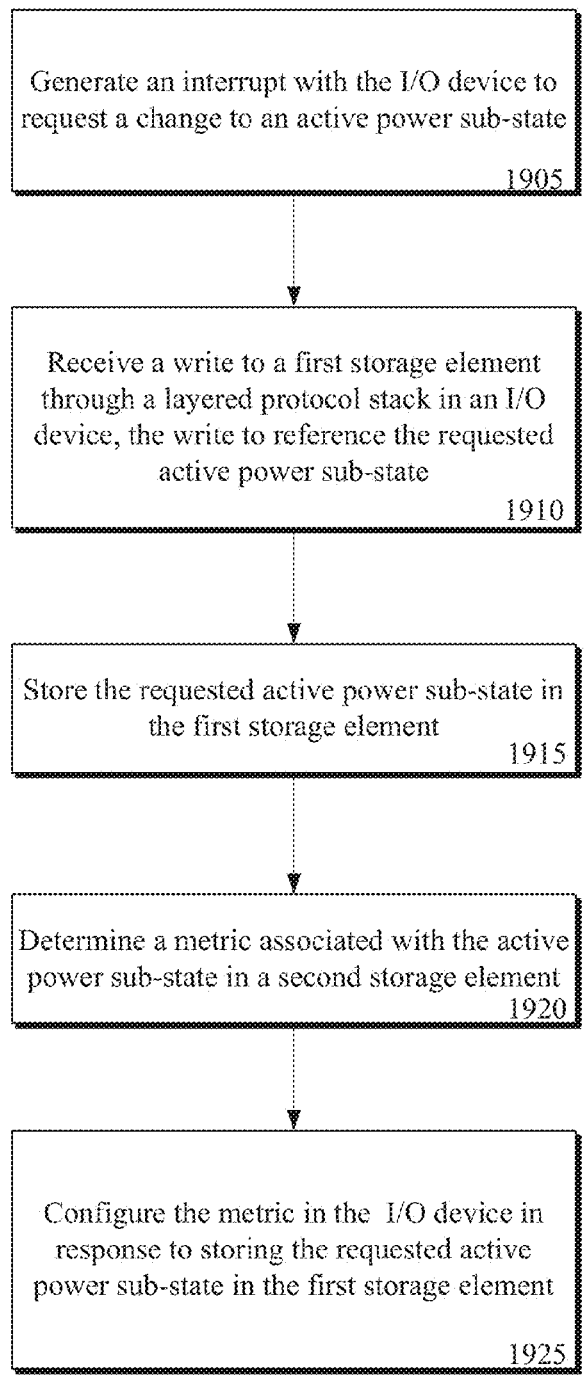
FIG. 19 illustrates an embodiment of a flow diagram for a method of setting active sub-state in a device.

Referring next to FIG. 19 an embodiment of a flow diagram for a method of setting an active sub-state in a device is illustrated. In flow 1905, an interrupt is generated with an I/O device to request a change to an active power sub-state. As noted above, the interrupt may be trapped by firmware or other agent. A write to the I/O device is generated to set the active power sub-state in response to servicing the interrupt. Before generating an interrupt, an interrupt field in a first storage element may be set to enable generation of interrupts.

In flow 1910 a write to a first storage element is received through a layered protocol stack in the I/O device. In one embodiment, the first storage element is a configuration register in a configuration register space of the I/O device. The write is to set a field in the first storage element to the active sub-sate or another active-sub state based on the request. In one embodiment, the I/O device is a PCIE device including a PCIE layered protocol stack. Next, in flow 1915 the requested active power-sub state is stored in the first storage element.

A metric associate with the active-power sub-state is determined from a second storage element. In one embodiment, the second storage element is a configuration register in a configuration register space of the I/O device. As a first example, the active sub-state is located in a data-structure including the second storage element, and a metric associated with the active sub-state in the second storage element is read out.

In one embodiment the metric is a performance metric, as described above. In another embodiment, the metric is a power metric, as described above. Examples of a metric include a frequency, a latency, a transition latency, a thermal value, a number of sub-units of the I/O device to be active, a performance percentage of a maximum performance, a vendor defined performance metric, a voltage, a rail voltage, a power value, and a percentage power value of a maximum power. Next, in flow 1925, the metric is configured in the I/O device in response to string the requested active power sub-state in the first storage element. Essentially the power and performance metrics are set to the active power sub-state values to set the I/O device to the active power sub-state.

Device and Shared Memory Window Caching

Figure 20:
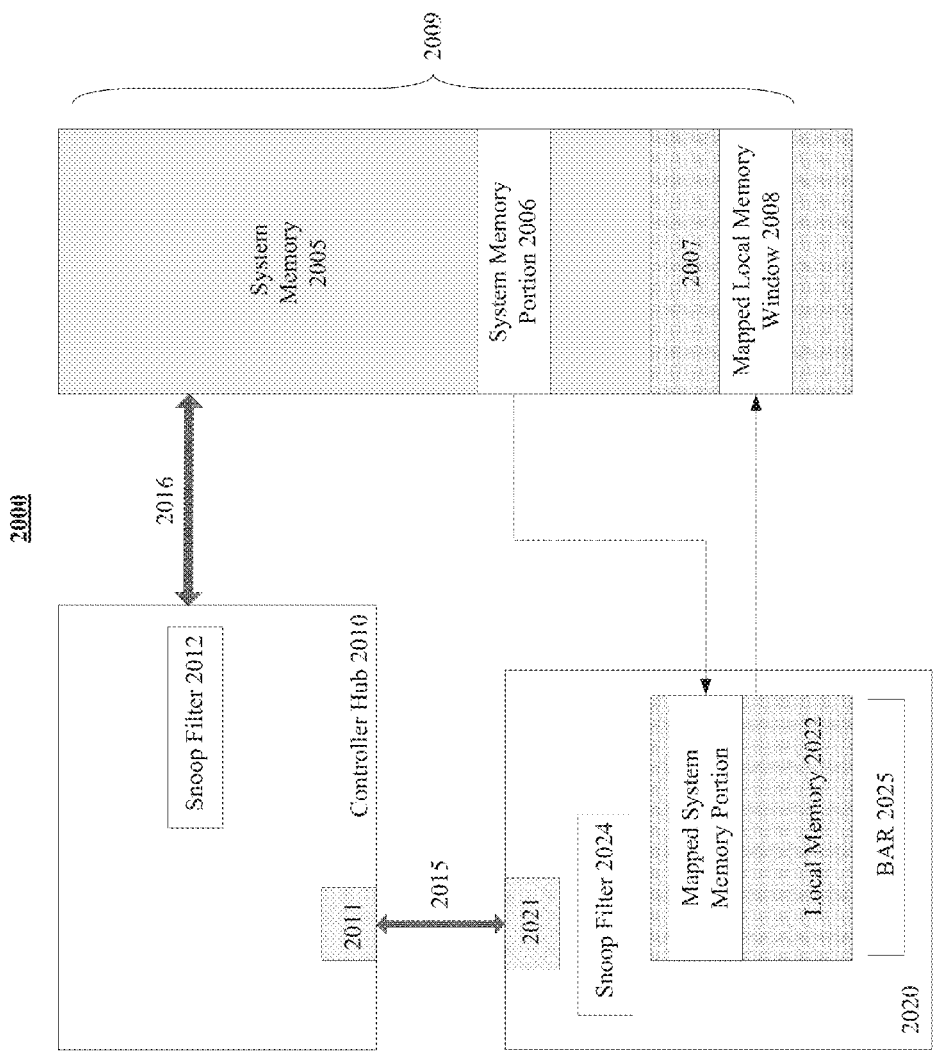
FIG. 20 illustrates an embodiment of a system including a portion of local memory mapped into a host memory space and a portion of system memory mapped into a local memory space.

In FIG. 20, an embodiment of a system capable of mapping portions of local and system memory into each other as caches is illustrated. Here system memory 2005 includes any shared memory, such as a DRAM, NVRAM, or other memory device. System memory 2005 is typically available in shared/host memory space 2009, although some portions may be invisible to host memory space 2009.

Here, device 2020 is associated with local memory 2022, which may include SRAM, NVRAM, or other local memory. Device 2020 includes an I/O device, such as a graphics accelerator, add-in card, network processor, or other I/O device. Portion 2023 of local memory 2022 is mapped into host address space 2009. As a result, a processor, not shown, or other device is able to see mapped local memory window 2008 as part of host address space 2009. As a result, other resources are able to share access to device 2020's local memory 2022 through window 2008.

In one embodiment, Base Address Register (BAR) 2025 to store a base address for device 2020 is utilized to map portion 2023 into host memory space 2009. Often in a page table structure, a BAR stores a starting address for a logical/linear/virtual view of memory. For example, a BAR includes a reference to a page director entry (PDE), that stores a reference to a page table entry (PTE), that includes a range of addresses/offsets. In this regard, the BAR stores a reference to an address within host address space 2009 to include window 2008. Note that some portions of local memory 2022 are potentially invisible in system memory space 2009.

In one embodiment, mapped local memory window 2008 is to be utilized as a cache for local memory 2022 to improve bandwidth and latency for accesses to local memory 2022 by another device, such as a processor in system 2000. As a result, elements are fetched to window 2008 from local memory 2022 and potentially stored in cache coherency states, such as MESI states. Other devices, such as processors in system 2000 access local memory 2022 through window cache 2008. When an element is requested and a hit in window 2008 occurs, the element may be directly provided to a requesting agent. In contrast, upon a miss the requested element is fetched from local memory 2022.

In one embodiment, window cache 2008 is utilized as a write-back cache, where elements are stored in window 2008 and later written-back to local memory 2022. Other styles/attribute of caches, such as write-through caches, may also be used. In another embodiment, snoop filter 2012 is included in controller hub 2010 to filter snoops to/from window cache 2008 to reduce snoop traffic on memory interface 2016 and on SP2P link 2015.

Similar to mapping of a portion of local memory 2022, in one embodiment, portion 2006 of system memory 2005 is mapped into local memory 2022 to be utilized as an accelerator cache of system memory. Here, operation is similar to window I/O cache, as mapped system memory portion 2023 operates as window cache 2023. In one embodiment, window cache 2023 utilizes write-back cache memory attributes to interface through SP2P link 2015 and memory interface 2016 with system memory 2005. In one embodiment, mapping of system memory portion 2006 into local memory 2023 includes setting a portion of system memory 2006 as logically viewable in device 2020's local memory address space.

In one embodiment, snoop filter 2024 is to filter a first plurality of snoop requests associated with the local memory. In other words, snoop filter 2024 is to track a first number of lines of local memory 2022 that are cached in window cache 2008 and to filter snoops to a second number of lines of local memory 2022 that are not cached. Similarly, snoop filter 2012 is to track a first number of lines of system memory 2025 that are cached in window cache 2023 and to filter snoops to a second number of lines of system memory 2005 that are not cached.

Figure 21:
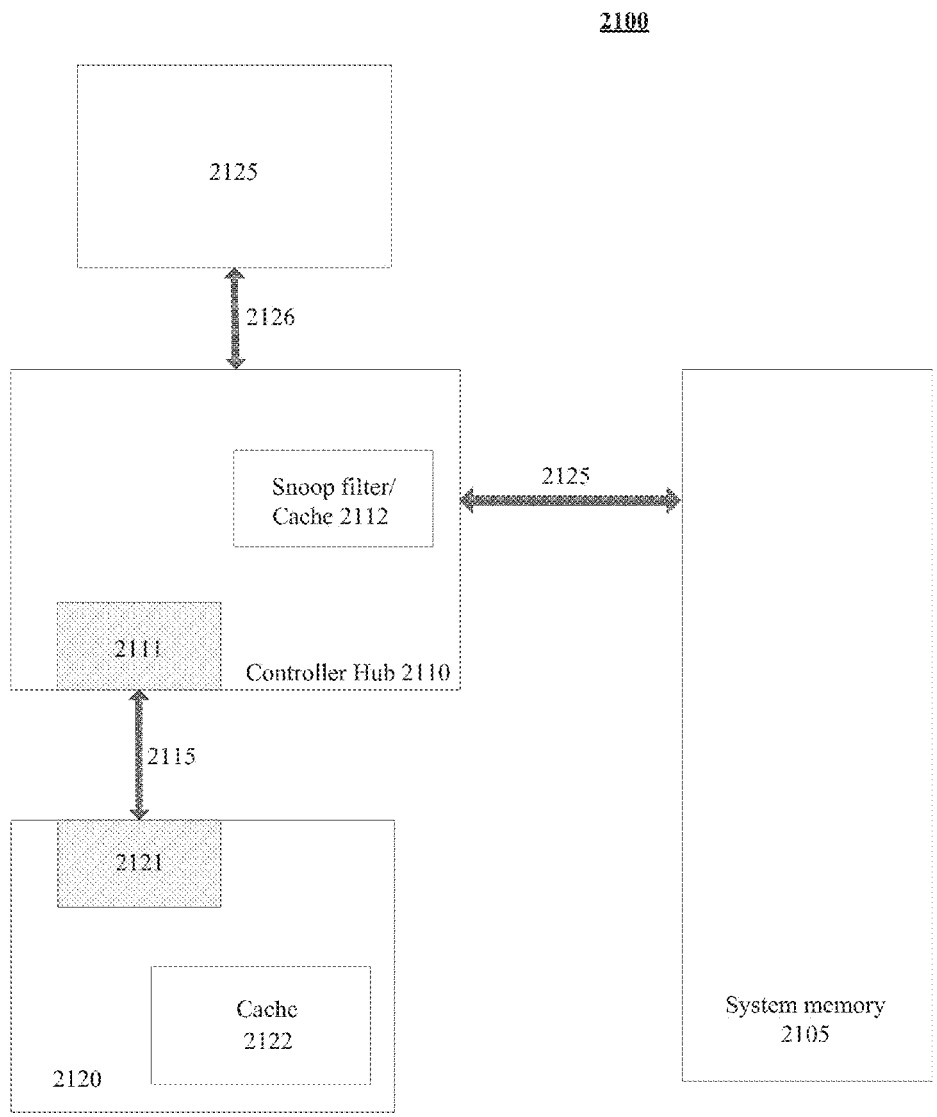
FIG. 21 illustrates an embodiment of a system including an I/O device having a cache.

FIG. 21 illustrates an embodiment of a system including an I/O device having a cache. System 2100 includes any electronic system, such as a computer system. Processor 2125 is coupled to controller hub 2110 through front-side bus (FSB) 2126. Controller hub 2110 is coupled to system memory 2105 through memory interface 2109 and to I/O device 2120 through SP2P link 2115. I/O modules 2111 and 2121 implement a layered protocol stack to facilitate communication between device 2120 and controller hub 2110. In one embodiment, controller hub 2110 includes a cache. For example, controller hub 2110 is a chipset including a chipset cache. In one embodiment, snoop filter 2112 is present and/or replicated in device 2120.

With cache 2122 residing in device 2120, potentially new requests/transactions are available to support I/O device caching. For example, new possible upstream requests include a read share for cache 2122 to mark a line shared, a read current to get a snapshot, a read exclusive to mark a line in exclusive or modified state on a write. In addition, a downstream snoop invalidate transaction is supported for shared or exclusive/modified states. Moreover, new responses may be supported such as a writeback response with/without data that relinquishes ownership, a snoop response with/without data that relinquishes ownership, and a data response for any MESI state.

In one embodiment cache 2122 exhibits write-back and/or write-through caching attributes. In this regard, cache 2122 and cache 2112 operate to cache system memory 2105 elements in different locations in system 2100. Consequently, locality caching hints, as discussed above, may be utilized to cache specific lines/elements in different location to enable quicker access. As a result, control logic in cache 2122 may also be capable of receiving and interpreting prefetch/caching hints.

In addition, an I/O device cache, such as cache 2122 is capable of caching lines in cache coherency states in addition to traditional MESI states. As a first example, cache 2122 holds a line in a Fetch In Progress (FIP) state indicating a fetch is in progress. An other example includes a Snapshot (C) coherency state to indicate a snapshot of a cache line.

Examples of Device 2120 include a graphics accelerator, a network controller, an add-in card, an audio processor, or other I/O device. I/O device 2120 includes cache 2122 capable of maintaining cache lines in a MESI cache coherence state. A root controller, such as controller hub 2110, in one embodiment, maintains a directory of cache lines cached by device 2120. In this regard, snoop filter 2112 stores a page address, a status indicator, a host physical address for the page, and a requesting ID of the requesting agent that is caching a referenced line. As a result, snoop filter 2112 may be partitioned among multiple I/O devices/switches.

As illustrated above, temporal and locality caching/prefetching hints are capable of being provided in a SP2P interconnect fabric. Specifically, in PCIe requests/messages hints are provided to enable more efficient memory access, caching, and prefetching for subsequent execution. In addition, extensions/enhancements including new message codes allow for atomic operations to be performed/requested by PCIe devices. As a result, the expensive locks by I/O devices to shared memory locations may be avoided, and thereby arbitrated among all resources to provide efficient atomic ownership acquisition of shared data locations.

Furthermore, transactions are able to be re-ordered to provide for efficient page table memory accesses while ensuring memory location integrity by maintaining priority of corresponding transactions to a same memory location. As previous PCIe essentially included one active power state and a plurality of inactive power states, new configuration registers and system power management techniques allow for more efficient power and performance management. Finally, mapping of device local memory as a window cache in a host memory space, and inversely, system memory as a second window cache in the device local memory space enables efficient latency and bandwidth access between processors and PCIe devices.

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical, optical, acoustical or other form of propagated signals (e.g., carrier waves, infrared signals, digital signals); etc.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
an I/O element to:
receive a transaction layer packet of a transaction from a device over an interconnect;
identify, from a header of the packet, an atomic operation request on a data unit, wherein the header comprises a type field to indicate an atomic operation type of the atomic operation request, a tag field, a requester identifier (ID) field, and an address field; and
service the atomic operation request.

2. The apparatus of claim 1, wherein the interconnect comprises at least one of a Peripheral Component Interconnect Express (PCIe)-compliant interconnect, a physical layer to support PCIe protocols, a Common Systems Interconnect (CSI)-compliant interconnect, and a physical layer to support a layered communication protocol.

3. The apparatus of claim 1, wherein the I/O element includes a layered protocol stack including a transaction layer, a link layer, and a physical layer.

4. The apparatus of claim 1, wherein the apparatus comprises a root controller.

5. The apparatus of claim 1, wherein the I/O element is to send a completion message in response to the received packet based at least in part on servicing of the atomic operation request.

6. The apparatus of claim 5, wherein the completion message identifies a value of the particular data unit prior to servicing of the atomic operation request.

7. The apparatus of claim 1, wherein the atomic operation request is for a read-modify-write atomic operation on the particular data unit.

8. The apparatus of claim 7, wherein the atomic operation includes performance of two's complement addition on a value of the particular data unit.

9. The apparatus of claim 7, wherein the atomic operation includes performance of a swap on a value of the particular data unit.

10. The appearance of claim 7, wherein the atomic operation includes performance of a conditional swap on a value of the particular data unit.

11. The apparatus of claim 1, wherein the atomic operation type is one of a group including:
a) two's compliment add,
b) swap, and
c) test and swap.

12. The apparatus of claim 1, wherein the address field identifies address information of the particular data unit.

13. An apparatus comprising:
logic to:
receive a packet including a packet header, wherein the packet header comprises a type field, a tag field, a requester identifier (ID) field, and an address field, wherein the packet is received over a Peripheral Component Interconnect Express (PCIe)-compliant interconnect and a value of the type field indicates whether the packet corresponds to a request for an atomic operation; and
identify that the packet corresponds to a particular type of atomic operation request based at least in part on the value of the type field; and
service the particular type of atomic operation request.

14. The apparatus of claim 13, wherein the type field identifies a type of requested operation.

15. The apparatus of claim 14, wherein the type is one of a group comprising:
a) a bit set operation;
b) a bit clear operation;
c) two's complement add operation;
d) add operation;
e) swap operation; and
f) test and swap operation.

16. A method comprising:
receiving a transaction layer packet from a device over a PCIe-compliant interconnect, wherein the packet comprises a packet header comprising a type field, a tag field, a requester identifier (ID) field, and an address field;
decoding the packet header to identify an atomic operation request on a data unit;
identifying, from a type field of the packet header, an atomic operation type of the atomic operation request; and
servicing the atomic operation request.

17. The method of claim 16, wherein servicing the atomic operation request includes:
reading a first value of the data unit;
writing a second, new value to the data unit; and
returning the first value of the data unit in a response to the device.

18. The method of claim 17, wherein the response includes a completion message sent to the device indicating that the atomic operation request has been serviced.

19. A system comprising:
a first I/O device;
a memory element; and
a second I/O device communicatively coupled to the first I/O device, wherein the second I/O device is to:
receive a packet from the first I/O device in a transaction over a PCIe-compliant interconnect, wherein the packet comprises a packet header and a payload, and the packet header comprises a type field, a tag field, a requester identifier (ID) field, and an address field:
decode the packet header to identify an atomic operation request on a data unit stored on the memory element and identify, from the type field of the packet header, an atomic operation type of the atomic operation request;

service the atomic operation request; and return a response to the first I/O device based on servicing of the atomic operation request.

20. The system of claim 19, wherein the first I/O device is to:

generate the atomic operation request, wherein the atomic operation request identifies one of a plurality of available atomic operation types; and receive the response from the second I/O device, wherein the response includes identification of a value of the data unit prior to servicing of the atomic operation request.

21. The system of claim 19, wherein the memory element includes host memory of the second I/O device.

22. The system of claim 21, wherein the first I/O device is included in a root controller and the root controller and second I/O device are communicatively coupled using the interconnect.

23. The system of claim 22, wherein the root controller is communicatively coupled over a PCIe-compliant interconnect to a plurality of endpoint devices including the second I/O device.

24. The system of claim 23, wherein the root controller is coupled to at least one microcontroller.

25. The system of claim 19, wherein the memory element comprises shared memory of the system.

* * * * *